United States Patent
Kim

(10) Patent No.: US 8,584,931 B2
(45) Date of Patent: Nov. 19, 2013

(54) SYSTEMS AND METHODS FOR AN AUGMENTED EXPERIENCE OF PRODUCTS AND MARKETING MATERIALS USING BARCODES

(75) Inventor: Peter Kim, Pasadena, CA (US)

(73) Assignee: John S.M. Chang, Irwindale, CA (US)

( * ) Notice: Subject to any disclaimer, the term of this patent is extended or adjusted under 35 U.S.C. 154(b) by 0 days.

(21) Appl. No.: 13/352,213

(22) Filed: Jan. 17, 2012

(65) Prior Publication Data

US 2012/0181330 A1 Jul. 19, 2012

Related U.S. Application Data

(60) Provisional application No. 61/433,130, filed on Jan. 14, 2011.

(51) Int. Cl.
*G06K 7/00* (2006.01)

(52) U.S. Cl.
USPC .......................................... 235/375; 235/379

(58) Field of Classification Search
USPC .................... 235/435, 439, 454, 462
See application file for complete search history.

(56) References Cited

U.S. PATENT DOCUMENTS

| 6,993,573 | B2 | 1/2006 | Hunter | |
|---|---|---|---|---|
| 2007/0063050 | A1 * | 3/2007 | Attia et al. | 235/462.46 |
| 2007/0109262 | A1 * | 5/2007 | Oshima et al. | 345/156 |
| 2007/0138270 | A1 * | 6/2007 | Reblin | 235/383 |
| 2007/0192403 | A1 * | 8/2007 | Heine et al. | 709/203 |
| 2009/0024690 | A1 | 1/2009 | Han | |
| 2012/0153015 | A1 * | 6/2012 | Gomez et al. | 235/375 |

FOREIGN PATENT DOCUMENTS

| KR | 1020030022630 A | 3/2003 |
|---|---|---|
| WO | 03073370 A1 | 9/2003 |
| WO | 2008139143 A1 | 11/2008 |

OTHER PUBLICATIONS

International Search Report and Written Opinion issued in related International Patent Application No. PCT/US2012021579 mailed Nov. 28, 2012 (12 pages).

* cited by examiner

*Primary Examiner* — Michael G Lee
*Assistant Examiner* — Matthew Mikels
(74) *Attorney, Agent, or Firm* — Procopio, Cory, Hargreaves & Savitch LLP; Noel C. Gillespie

(57) ABSTRACT

Systems and methods for augmenting a user experience using a barcode. In an embodiment, the system and methods comprises receiving a first request for content associated with a barcode from a user. A response is sent which provides content for creating a personalized message. The user may then interact with a message creation application to create a personalized message. Subsequently, a second request for content associated with the barcode may be received. In response to this request, the personalized message, instead of the content for creating the personalized message, may be provided.

20 Claims, 52 Drawing Sheets

INTERACTIVE MESSAGE
Product Labeling
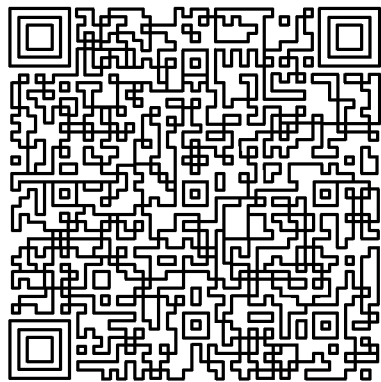
SWEEPSTAKES
SOCIAL/SHARE
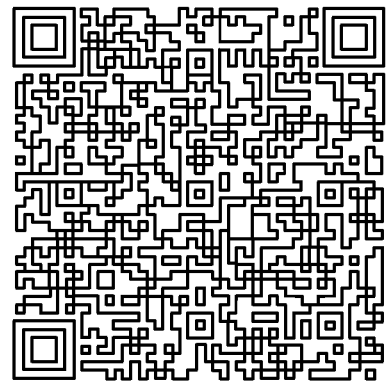
FIG. 5

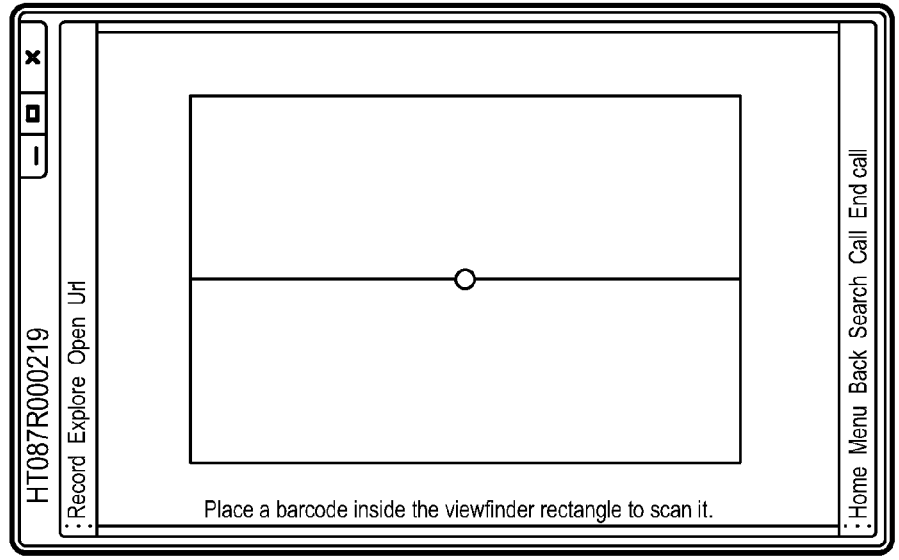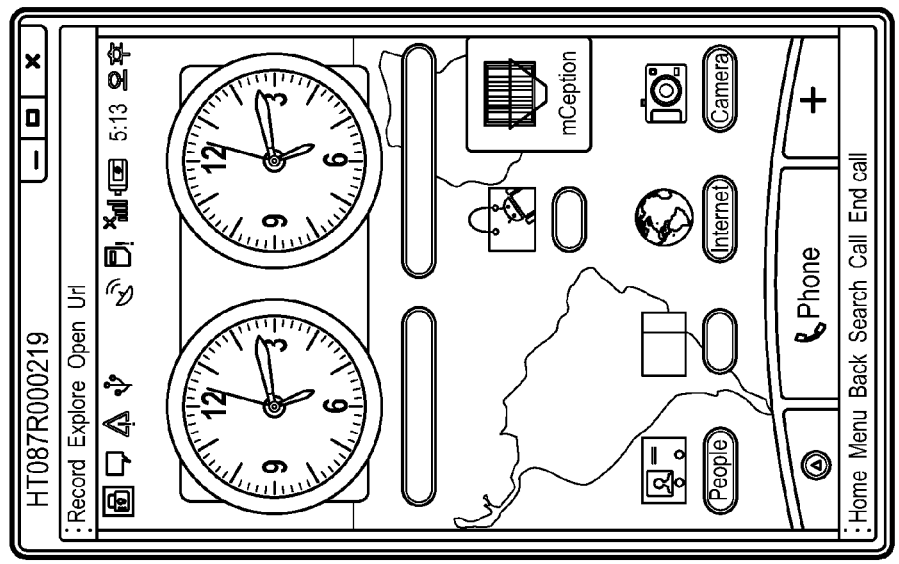
FIG. 17

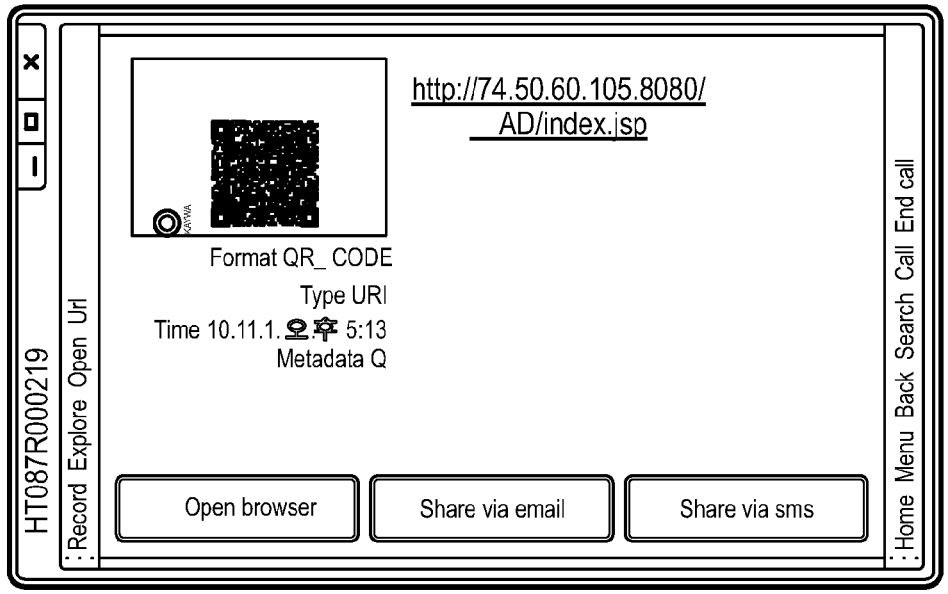
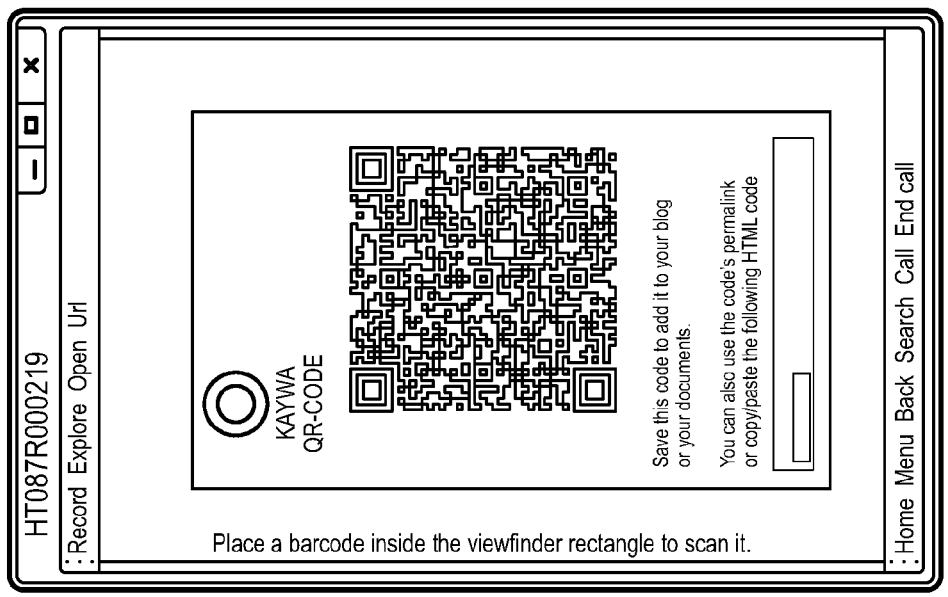
FIG. 20

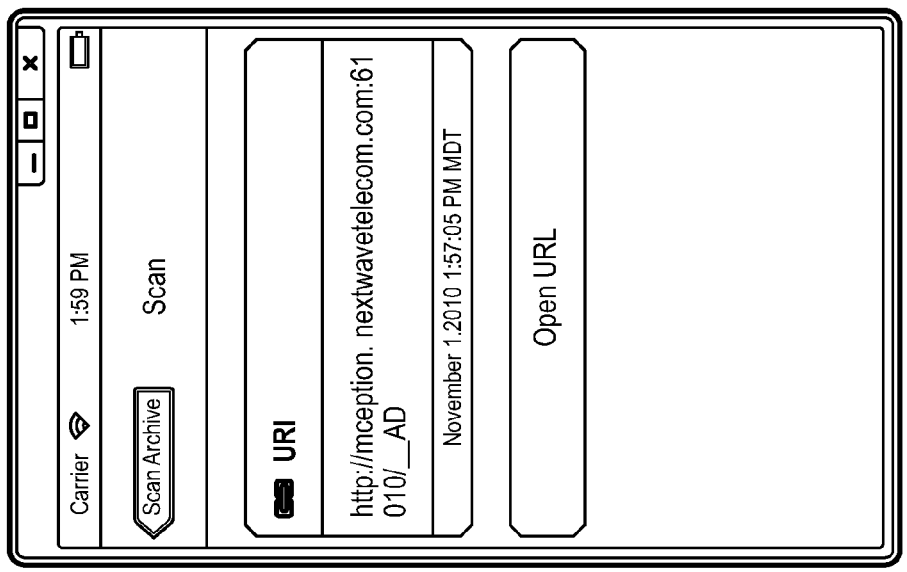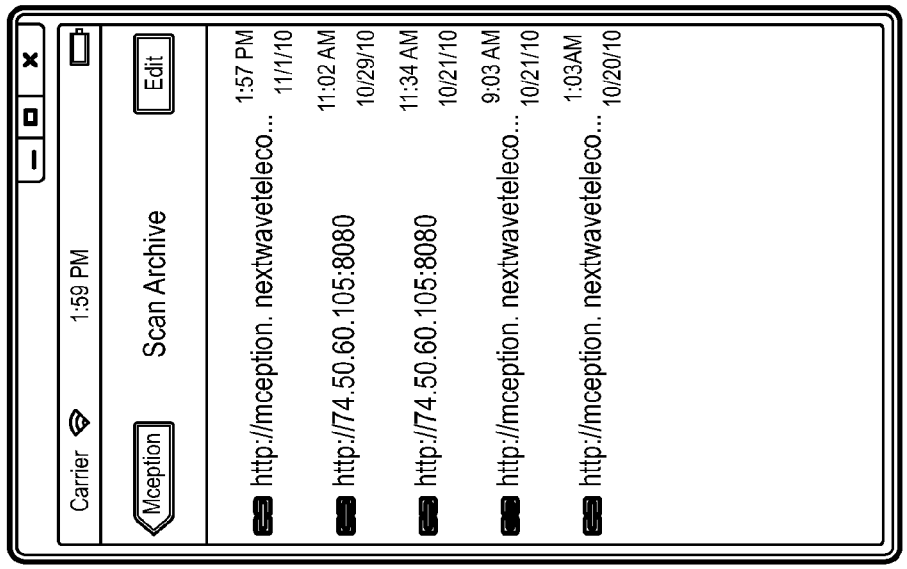
FIG. 27

System and Method for a 4-D Virtual Reality (or Augmented Reality) Experience for Marketing, Products and Point of Interest and Sales

SYSTEMS AND METHODS FOR AN AUGMENTED EXPERIENCE OF PRODUCTS AND MARKETING MATERIALS USING BARCODES

PRIORITY

This application claims priority to U.S. Provisional Patent App. No. 61/433,130, filed on Jan. 14, 2011, titled "Systems and Methods for Augmented Reality Experience for Marketing, Products and Point of Interest and Sales," the entirety of which is hereby incorporated herein by reference.

BACKGROUND

The embodiments described herein are related to barcodes and barcode scanner applications for user devices (e.g., smart phones, tablets, etc.) that enable users to access features, applications and tools, associated with the barcodes using their user devices.

SUMMARY

In an embodiment, a system for augmenting a user experience using a barcode is disclosed. The system may comprise at least one hardware processor and at least one executable software module. The at least one executable software module may be configured to, when executed by the at least one hardware processor, receive a first request for content associated with a barcode, respond to the first request by providing content for creating a personalized message, receiving a personalized message, receive a second request for content associated with the barcode, and respond to the second request by providing the personalized message.

In an embodiment, a method is provided for augmenting a user experience using a barcode is disclosed. The method may comprise receiving a first request for content associated with a barcode, responding to the first request by providing content for creating a personalized message, receiving a personalized message, receiving a second request for content associated with the barcode, and responding to the second request by providing the personalized message.

In another embodiment, a system for tracking user interactions with barcodes is provided. The system comprises at least one hardware processor, at least one database, and at least one executable software module. The at least one executable software module may be configured to, when executed by the at least one hardware processor, receive a first request from a user, the first request comprising a user identifier and data from a first barcode, store a first record of the first request in the at least one database, the first record comprising the user identifier, receive a second request from the user, wherein the second request comprises the user identifier and data from a second barcode, store a second record of the second request in the at least one database, the second record comprising the user identifier, and identify an association between the first record and the second record based on the user identifier.

BRIEF DESCRIPTION OF THE DRAWINGS

Features, aspects, and embodiments are described in conjunction with the attached drawings, in which:

FIG. 5 illustrates examples of matrix barcodes, according to an embodiment;

FIGS. 17-27 illustrate examples use of a mobile barcode scanning application, according to various embodiments;

DETAILED DESCRIPTION

After reading this description, it will become apparent to one skilled in the art how to implement the embodiments described herein, as well as various alternative embodiments and alternative applications. The following description sets forth numerous specific details, such as examples of specific systems, components and methods in order to provide a good understanding of the numerous disclosed embodiments. It will be apparent to one skilled in the art, however, that at least some embodiments may be practiced without these specific details. In other instances, well-known components or methods are not described in detail or are presented in simple block diagram format in order to avoid unnecessarily obscuring the described embodiments. Particular implementations may vary from these exemplary details and still be within the spirit and scope of the embodiments described.

Described herein are systems and methods for a barcode application and/or scanner which may reside on a user device and enable a user of the user device to read and otherwise interact with one or more barcodes. The barcodes may be one-dimensional (1D), two-dimensional (2D), and/or three-dimensional (3D) barcodes, and may be open-source or proprietary. The application may enable the user to access features, applications and tools associated with the barcodes.

Figure 1:
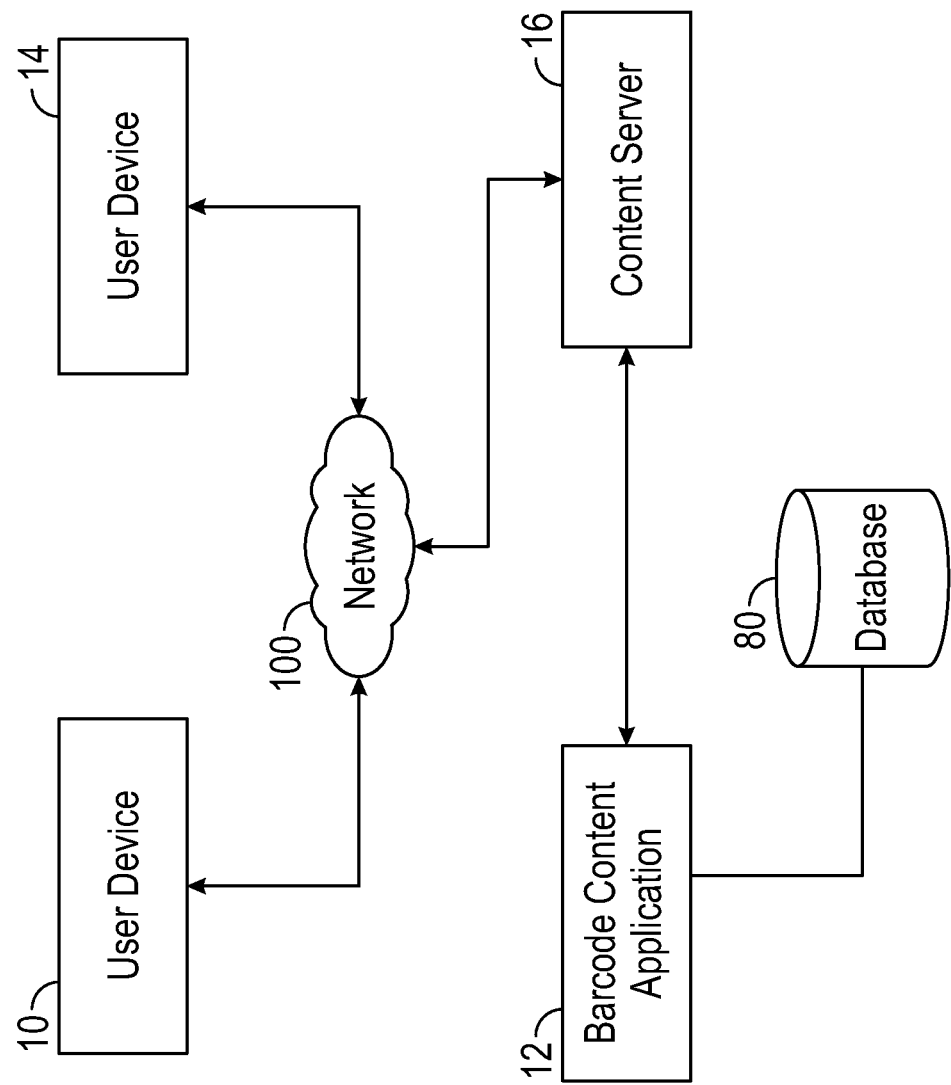
FIG. 1 is a high-level block diagram of a collection of computer systems which can interact with each other via a connection, such as a network, in accordance with an embodiment.

Referring to FIG. 1, a block diagram is shown of a collection of computer systems which may interact with each other by way of an electronic connection, such as a network or direct connection. In an embodiment, a network 100 (e.g., the Internet, local area network, wide area network, virtual private network, etc.) provides the connection between the devices in FIG. 1. Each of the blocks shown in FIG. 1 represents a computer system, such as a server, a personal computer, mobile device (e.g., smart phone, tablet PC), or other device capable of communicating over an electronic connection, or a collection of such devices, and are generally referred to herein as devices.

User device 10 generally represents a device in the possession or control of a user. The user device 10 can be any network-enabled device. In general, the user device 10 is a machine (e.g., smart phone, tablet device), which may comprise hardware and/or software, with the ability to communicate with one or more of the other computer systems over a network 100, as depicted in FIG. 1. For example, in one embodiment, the user device 10 is a personal computer with a network connection such as an Internet connection. The user device 10 may also be a wireless device, such as a mobile telephone or a personal digital assistant, with access to a wireless network. User device 14 can be the same or a different type of device as user device 10. Device 16 represents a device (e.g., a Web server) that hosts and/or serves content, such as a website.

As mentioned above, user devices 10 and 14 may be any type of communications or computing device (e.g., a cellular phone, smart phone, or other mobile communication device, tablet device such as an iPad®, digital media player or other audio or audio/video player, personal digital assistant, etc.). User device 10 or 14 may be a smart phone, which is a combination mobile telephone and handheld computer having personal digital assistant ("PDA") functionality (e.g., iPhone, iPad, Blackberry, etc.). The teachings herein can be applied to other mobile computing devices (e.g., an iPad or other tablet computer, a laptop computer, etc.) or other electronic devices (e.g., a desktop personal computer, an iPod, a digital camera, etc.). PDA functionality can comprise one or more of personal information management, database functions, word processing, spreadsheets, voice memo recording, location-based services, device backup and lock, media playing, Internet browsing, etc. Devices 10 and 14 may be further configured to receive and operate additional applications provided to devices 10 and 14 after manufacture, e.g., via wired or wireless download, Secure Digital card, etc.

Devices 10 and 14 may be handheld computers (e.g., a computer small enough to be carried in a typical front pocket found in a pair of pants or other similar pocket), comprising such devices as typical mobile telephones and PDAs. In alternative embodiments, the teachings herein may extend to laptop computers, tablet PCs, desktop PCS, and other electronic devices with the functionality shown in FIG. 3B.

In one embodiment, device 16 represents a content server for providing content associated with barcodes to user devices 10 and 14. For example, user devices 10 and 14 may utilize an application residing on the user devices 10 and 14 to scan and read a barcode. The application may then use information embedded within the barcode to access content server 16 and/or send information embedded within the barcode to content server 16. In response, device 16 may provide or serve web pages which can be visited by users and used by users to interact with the system, as will be described in more detail below.

According to one aspect, block 12 of FIG. 1 represents an application, computer system, or device which provides the back-end functionality related to barcode content for the content server 16. Application 12 may reside on content server 16 or be otherwise communicatively connected to content server 16. Of course, other configurations of the computer systems and applications can also be implemented. For instance, in some embodiments, the barcode content application 12 is located directly on user devices 10 and 14 as a mobile application. In such embodiments, the barcode content application 12 may be configured to communicate with content server 16 over network 100.

Application 12 is in communication with a database 80. Database 80 allows application 12 to store necessary information that application 12 may need to access in order to perform the back-end functionality. In one example, application 12 supports a website which markets various products (e.g., Starbucks®, Subway®, gifts, electronics, etc.) to users. The application 12 may provide various functions, such as barcode generation, barcode conversion, content creation and/or selection, content attachment, communication or transfer of information associated with barcodes, barcode tracking, and the like.

Figure 2:
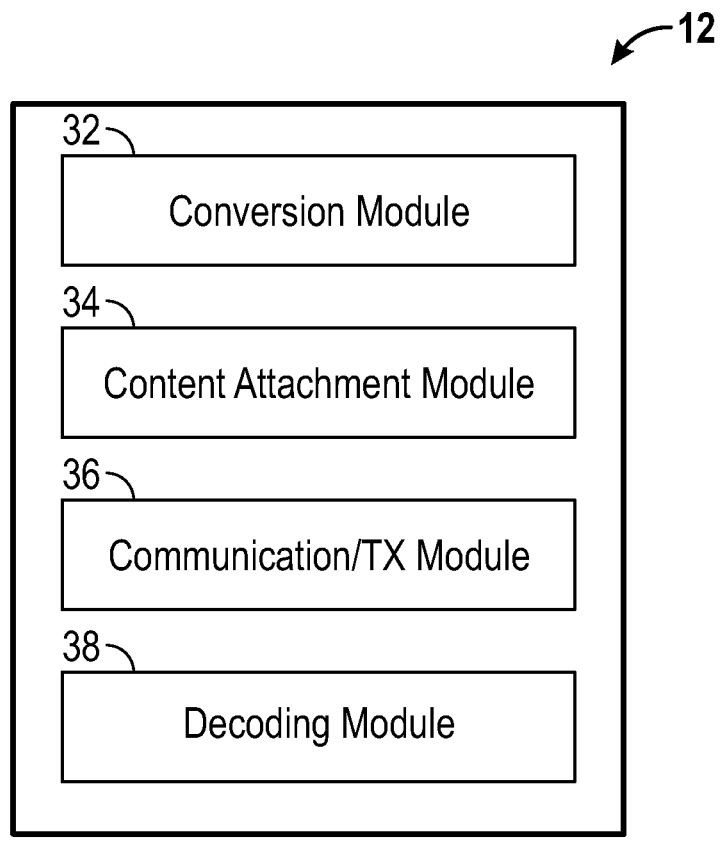
FIG. 2 is a high-level block diagram of the modules or functions which can be implemented by the disclosed system, according to an embodiment.
Figure 6:
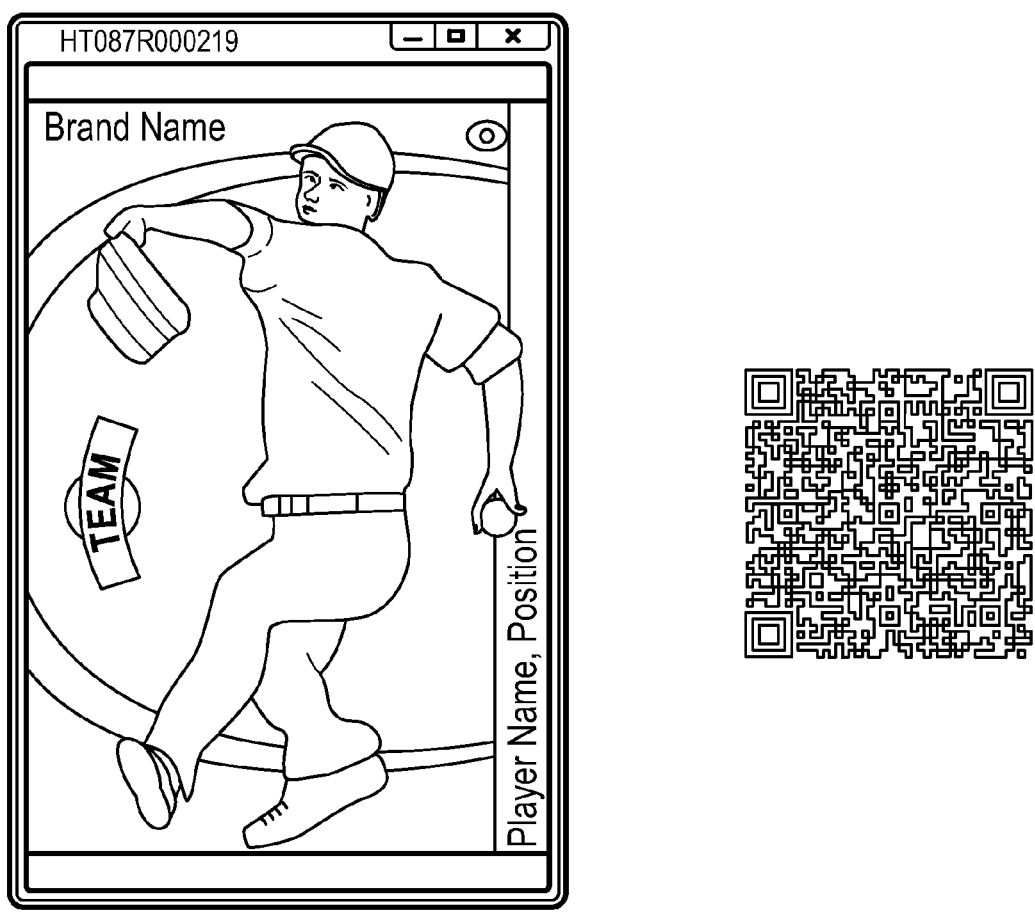
FIG. 6 illustrates examples of a product and associated matrix barcode, according to an embodiment.

FIG. 2 represents a block diagram of modules or functionality which may be implemented by application 12. These modules may hereinafter collectively be referred to as "barcode functionality" or "content builder." In one embodiment, the modules or functionality implemented by application 12 includes a conversion module 32, a content attachment module 34, a communication/transfer module 36, and a decoding module 38. Unless otherwise apparent from the context, the operations and actions described herein and represented in FIGS. 4-38 may be implemented by modules 32, 34, 36, and 38 of application 12. FIGS. 5 and 6 show examples of generated matrix barcodes; FIGS. 7-16, 30-33, 35, 37A-38F show examples of content which may be associated with barcodes; and FIGS. 4, 36, 39, 40, and 41 illustrate processes which may be used to generate barcodes, use barcodes, associate content with barcodes, and the like.

A user may scan a barcode, as shown, for example, in FIGS. 20, 23, 29, and 34. When a user scans or takes a picture of a barcode (e.g., a QR barcode) from a product that the user has purchased on his or her user device 10, an application on the user device 10 translates the barcode image into another form of data, which was previously encoded or embedded in the barcode.

In an embodiment, this data, which is translated from the barcode, may take the form of a character string, comprising letters, numbers, and other characters. For example, the character string may comprise a Uniform Resource Locator (URL), which identifies the address of a resource on the Internet. The character string may further comprise a query string comprising one or more parameters, for instance, to be used in conjunction with the URL.

Once the barcode has been converted into a resource indicator, the client application residing on user device 10 may retrieve the identified resource. For example, in an embodiment where the resource indicator comprises a URL—perhaps, with one or more parameters specified in a query string—the client application will retrieve a webpage identified by the URL. The webpage may be retrieved from a content server 16 via network 100. Alternatively, the client application may cause a browser application on user device 10 to retrieve the webpage identified by the URL.

Figure 13:
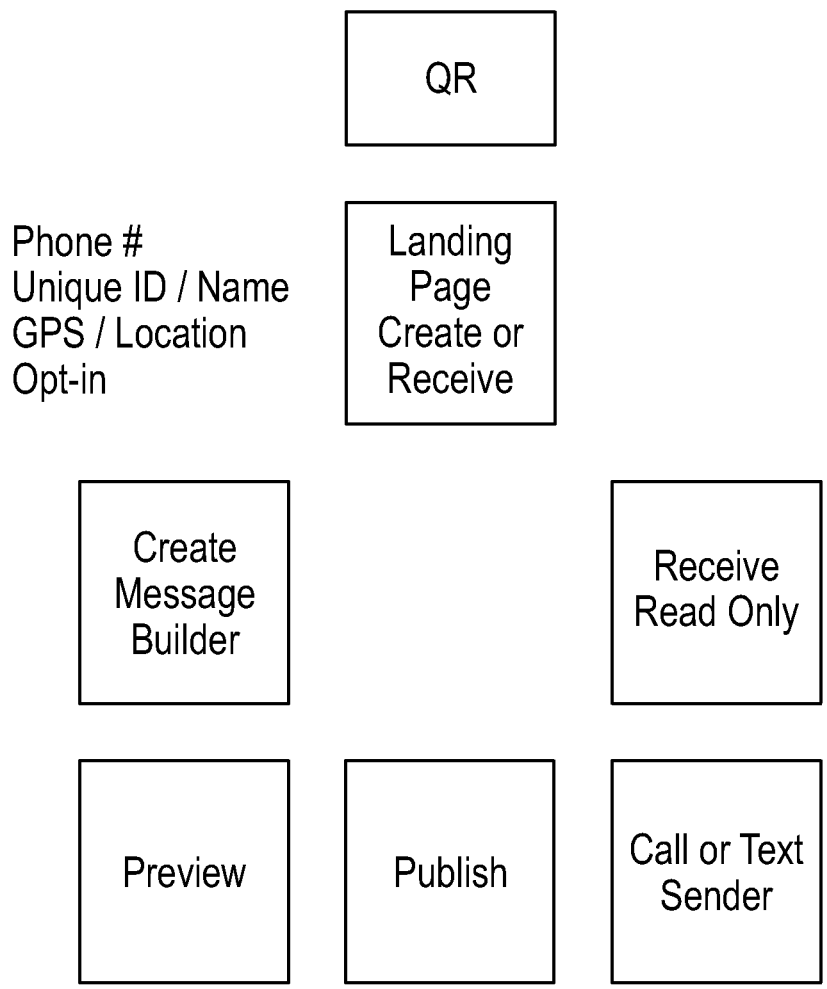
Figure 14:
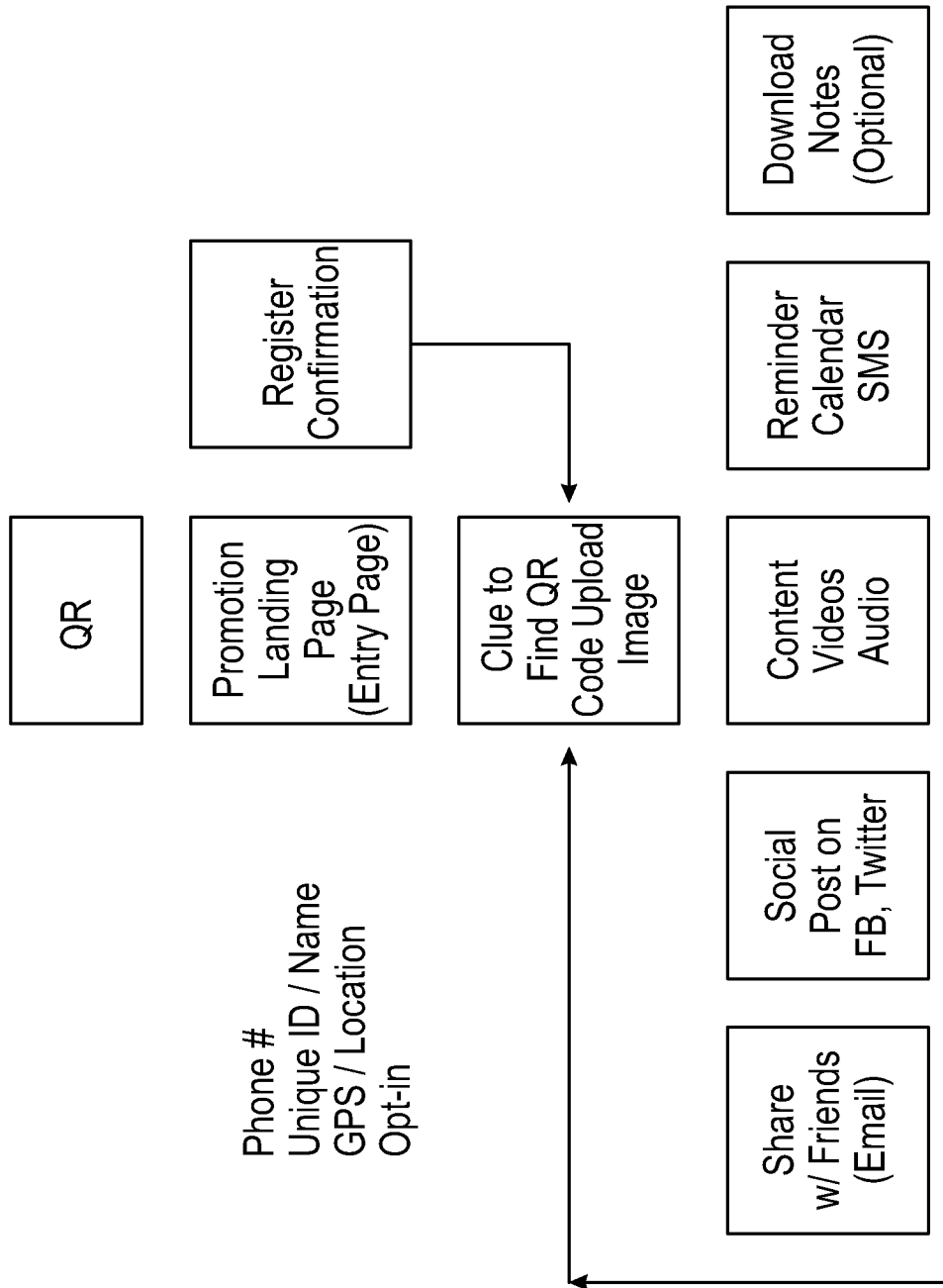
Figure 15:
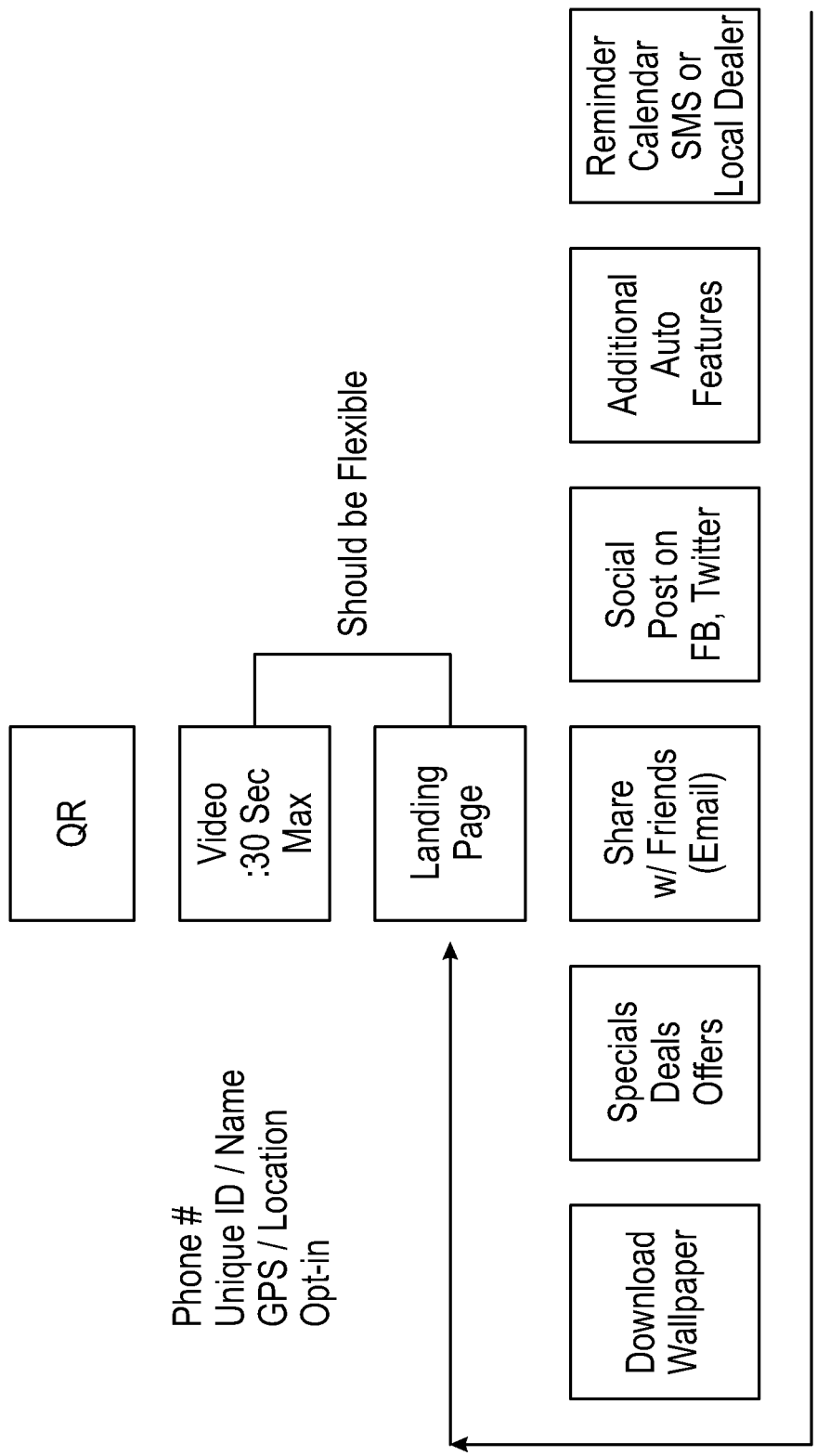

With reference to FIG. 13, according to one embodiment, the retrieved webpage comprises a user interface which permits a user of user device 10 to construct a personalized message, for example, by interacting with a create message builder module. The user is able to create a personalized—and, in some embodiments, interactive—message to be associated with the barcode. For instance, the user may upload an image or video and/or input a personalized text message. The user may also choose other attributes of the message, such as layout, background images, colors, themes, and the like, as well as a delivery method (e.g., call the sender, text the sender, mail a card to the sender). Once the user has created the message, he or she may be permitted to preview the message, as well as to edit or publish the message for an intended recipient (e.g., another user). The message may be implemented as webpage, e.g., using Hypertext Markup Language (HTML). Attachment module 34 may attach user-specified data (e.g., input or uploaded personalized and/or interactive data) to the electronic message. For example, attachment module 34 may associate the user-specified data with a predetermined template stored on content server 16 or another device. The webpage may be constructed at publication or dynamically when viewed using the template and the user-specified data (e.g., by the decoding module 38).

In an embodiment, conversion module 32 may associate a barcode (e.g., the URL and/or other data embedded in the barcode) with new or different content upon the completion of a user interaction. For instance, continuing with the above example, the URL embedded in the barcode was initially associated with a webpage comprising a user interface for creating a personalized and/or interactive message. Once a user has created and published the message, utilizing the user interface, the conversion module 32 may then associate the URL embedded in the barcode with the published or finalized message. Thus, the next time a user (e.g., the recipient) scans the barcode, the client application may retrieve a webpage which now displays the published personalized and/or interactive message, instead of the user interface for constructing the message.

The publishing of the message may be implemented by communication/transfer module 36. In some embodiments, once the message is published, any subsequent scans of the barcode will only retrieve the final message. This may be beneficial for gifts for holidays or any other occasions to create an interactive product. For instance, the barcode may be placed on a product or product packaging (e.g., boxes, dvds, game case, wrapping for flowers, etc.). A gift-giver could purchase the product and scan the barcode to retrieve a webpage for creating a personalized message. The gift-giver could then create the personalized message using a variety of backgrounds, images, colors, layouts, and the like, and finalize the message by "publishing" it. In some embodiments, the user (e.g., the gift-giver or sender) is allowed to edit the message up to three times prior to the message becoming final or finally published (i.e., no longer editable).

The gift-giver could then give the product, which includes the barcode (e.g., on the product itself or on the product's packaging), to the recipient of the gift. The recipient could scan the barcode using a client application on his or her user device. The client application may work in the same fashion as when the barcode was first scanned (e.g., retrieving a webpage at the specified URL). However, this time, since the message has been published, the content server 16 will return a webpage comprising the finalized message, rather than the webpage for creating the message. In some embodiments, after the recipient scans the barcode associated with the message, the decoding module 38 dynamically constructs the message and provides the data to the recipient in the form of a webpage or image.

While the above functionality has been described with reference to a user or gift-giver, it should be appreciated that a user may include a major corporation such as Starbucks® or Subway® that wishes to include promotional materials (e.g., coupons) with their products (e.g., on product packaging such as cups or disposable wrappers). In such embodiments, the message may be a coupon (which may or may not be personalized and/or interactive). Thus when a recipient of the corporation's product scans the barcode on their product (e.g., coffee cup or sandwich wrapper) using the client application on their user device, the user device is directed, via a URL embedded in the barcode, to a specific website (e.g., Starbucks.com™, Subway.com™) comprising the coupon.

The content may also comprise additional information related to the product associated with the barcode. For instance, as shown in FIG. 6, the product may be a baseball card comprising information related to a baseball player. A barcode may be printed on the card, and associated with additional information about the player. A user may scan the barcode and be directed by the client application to a website comprising interactive content related to the player or the player's team or sport.

The systems and methods described herein allow users to create matrix barcodes for marketing campaigns, product information, product distribution, and point of purchase or usage. In accordance with some embodiments, the barcode content application can track all types of information about the interactions defined by the campaign. This information may include, but is not limited to, the time of scan, the location of the scan (e.g., longitude and latitude or other geographic identifier), phone number or other user or device identifier, etc. Due to privacy concerns, in an embodiment, the client application or barcode content application 12 may not collect personally identifiable information (PII) or access the subscriber identification module (SIM) card of user devices 10 and 14.

In some embodiments, the matrix barcodes are linked (e.g., via a smart phone, tablet PC, or other user device) to an HTML5 mobile webpage (e.g., served and/or hosted by content server 16). As shown in FIGS. 8-12, 14, and 15, the system may allow users to save and share contacts or reminders, view videos in multiple formats, play audio, click to call a user, click to text a user (e.g., using SMS/MMS). The system may also collect data (e.g., email addresses, information for sweepstakes or promotions), and include an application programming interface API for content, social networking applications, map applications, online purchase and billing applications, online coupons, daily deals, etc.

Figure 7:
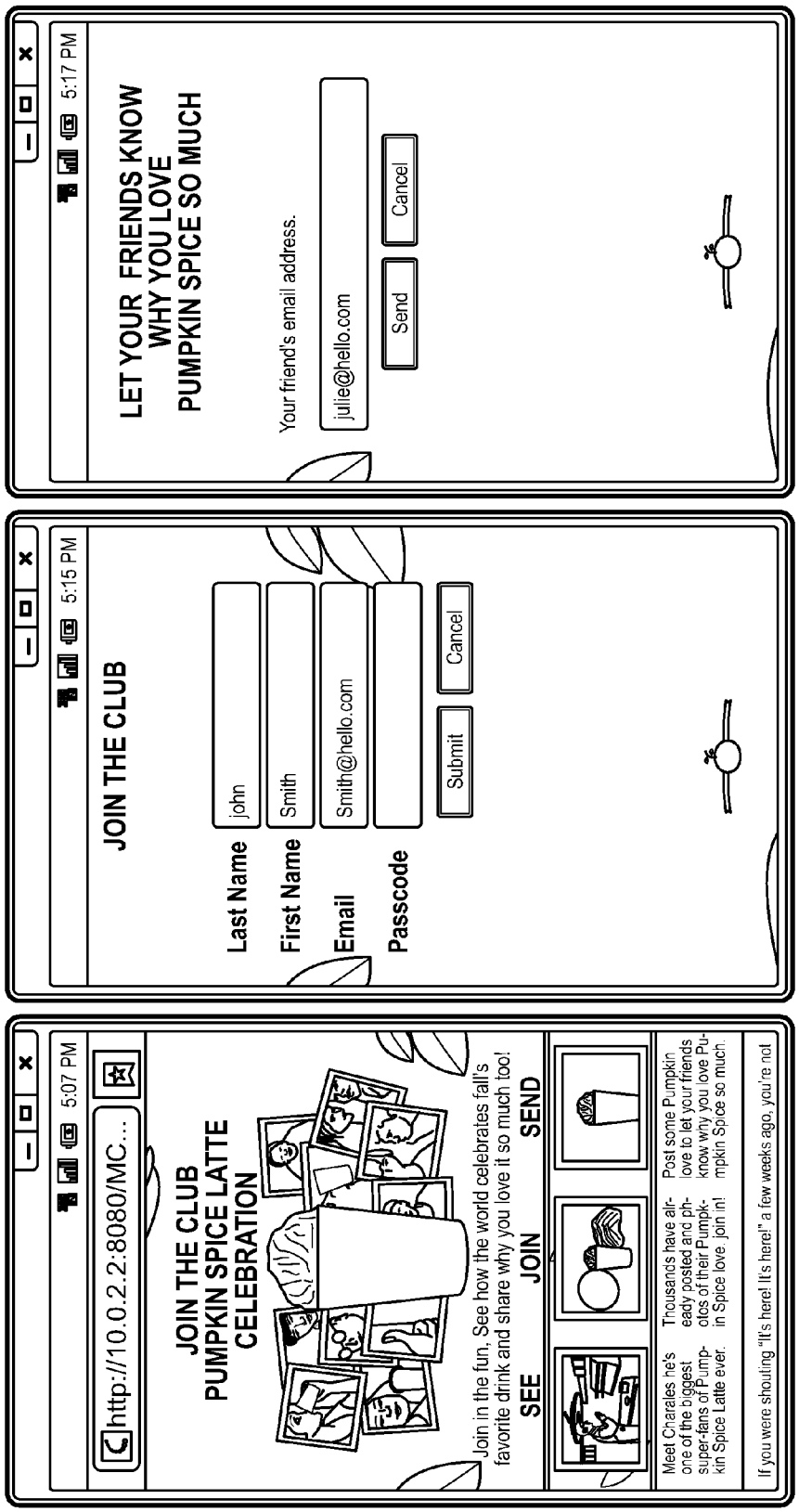
FIG. 7 illustrates example content which may be associated with a barcode, according to an embodiment.
Figure 8:
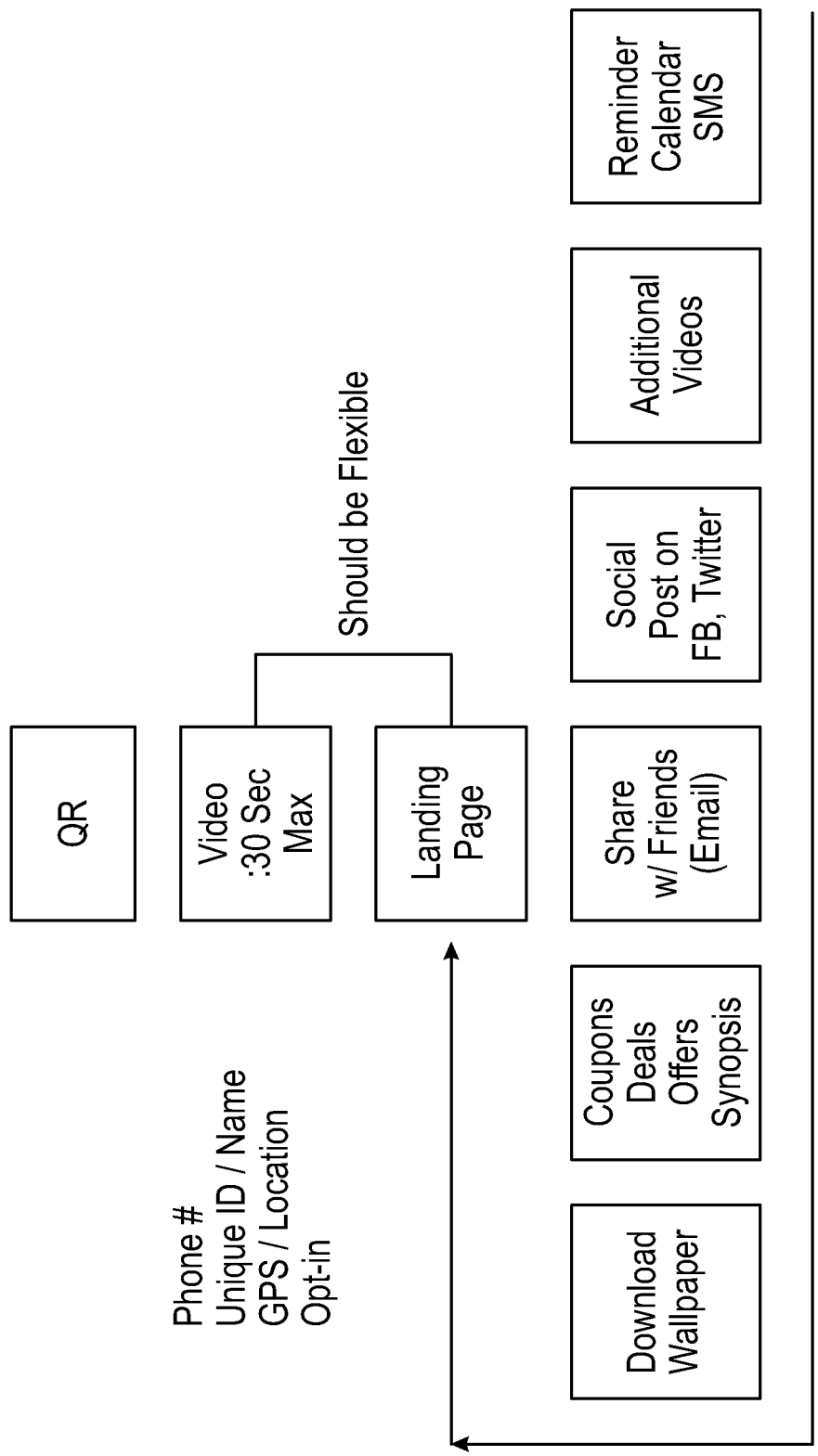
FIGS. 8-15 illustrate some of the content and options that can be incorporated into a portal associated with a barcode, according to various embodiments.
Figure 9:
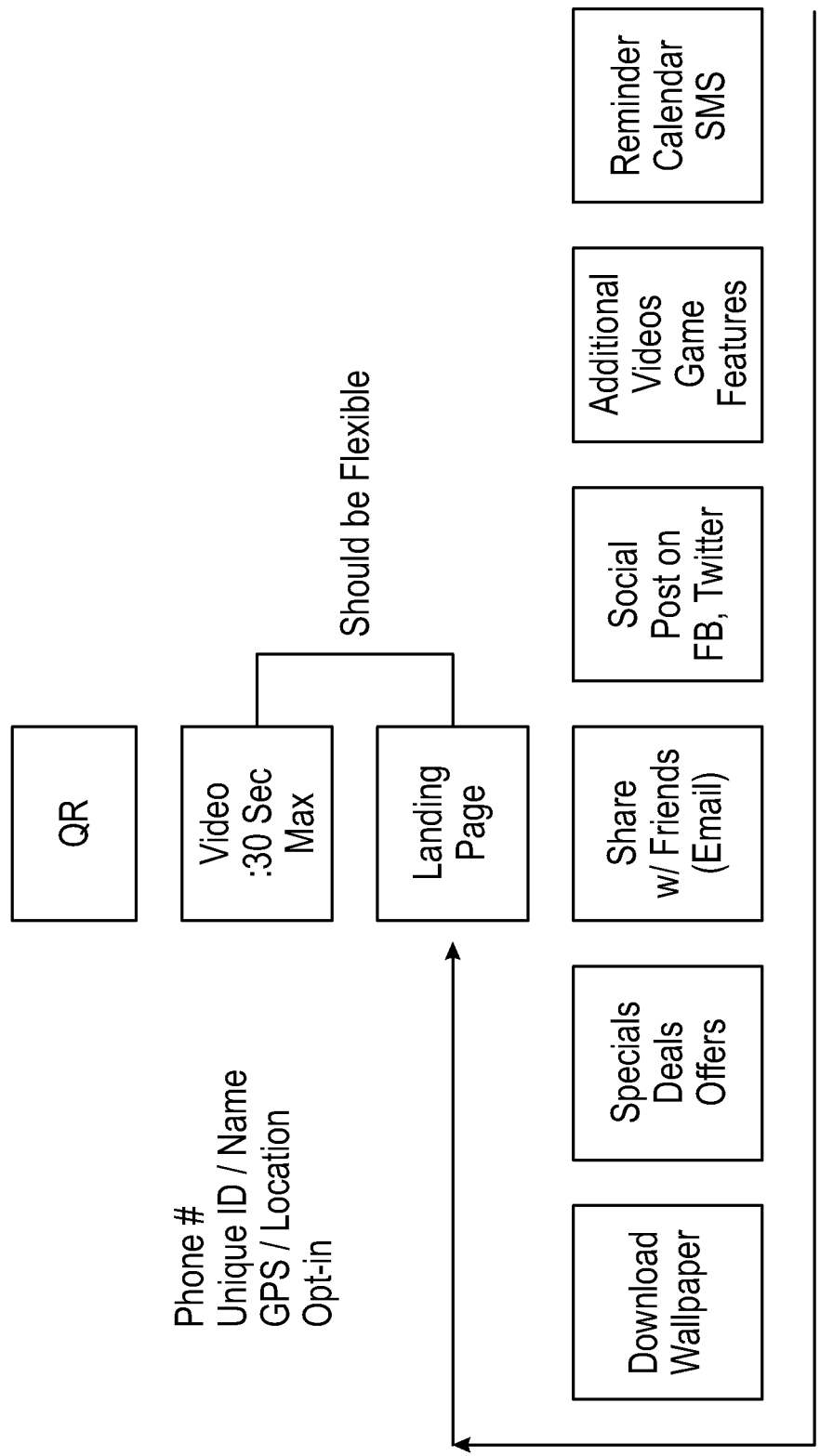
Figure 10:
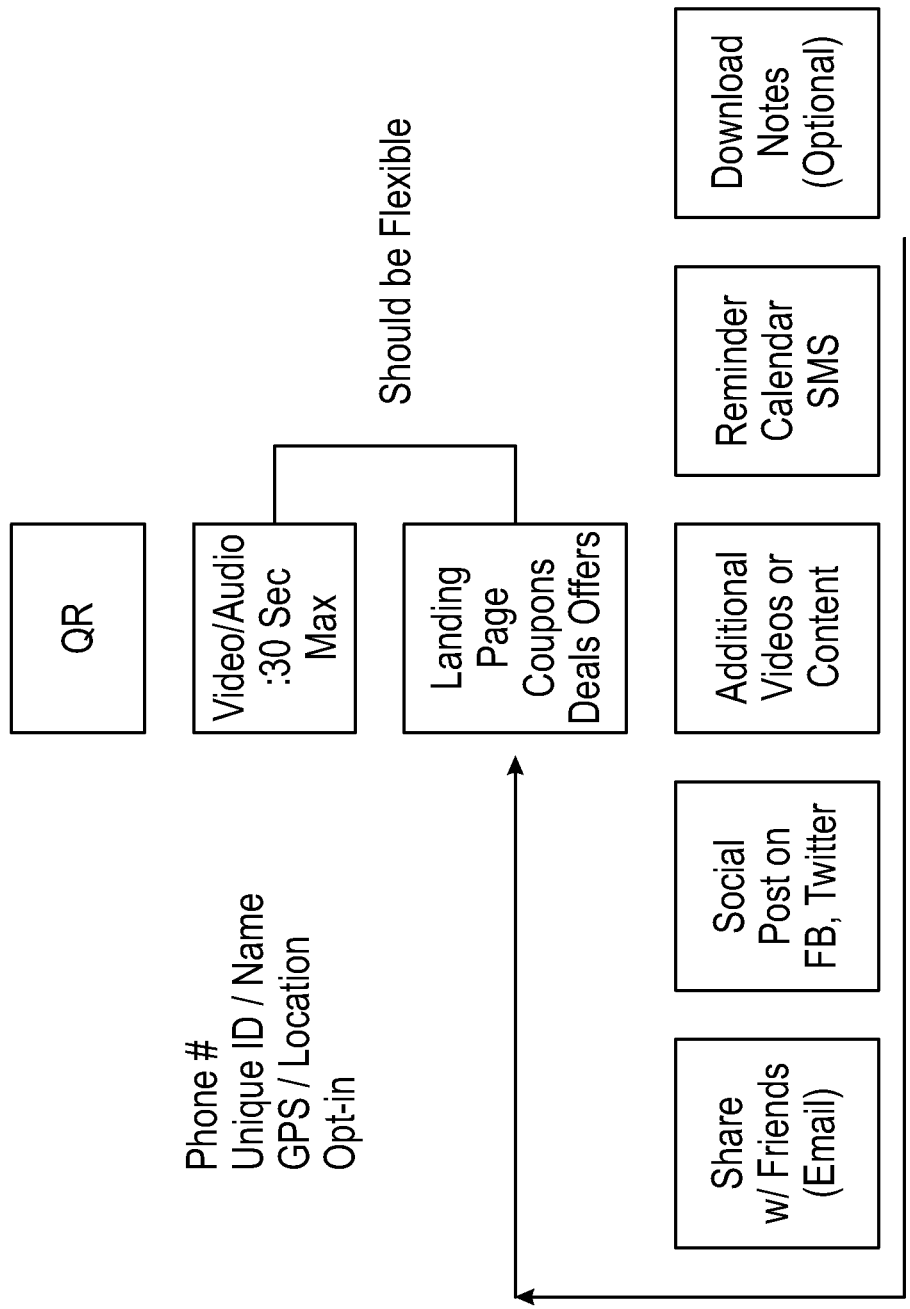
Figure 11:
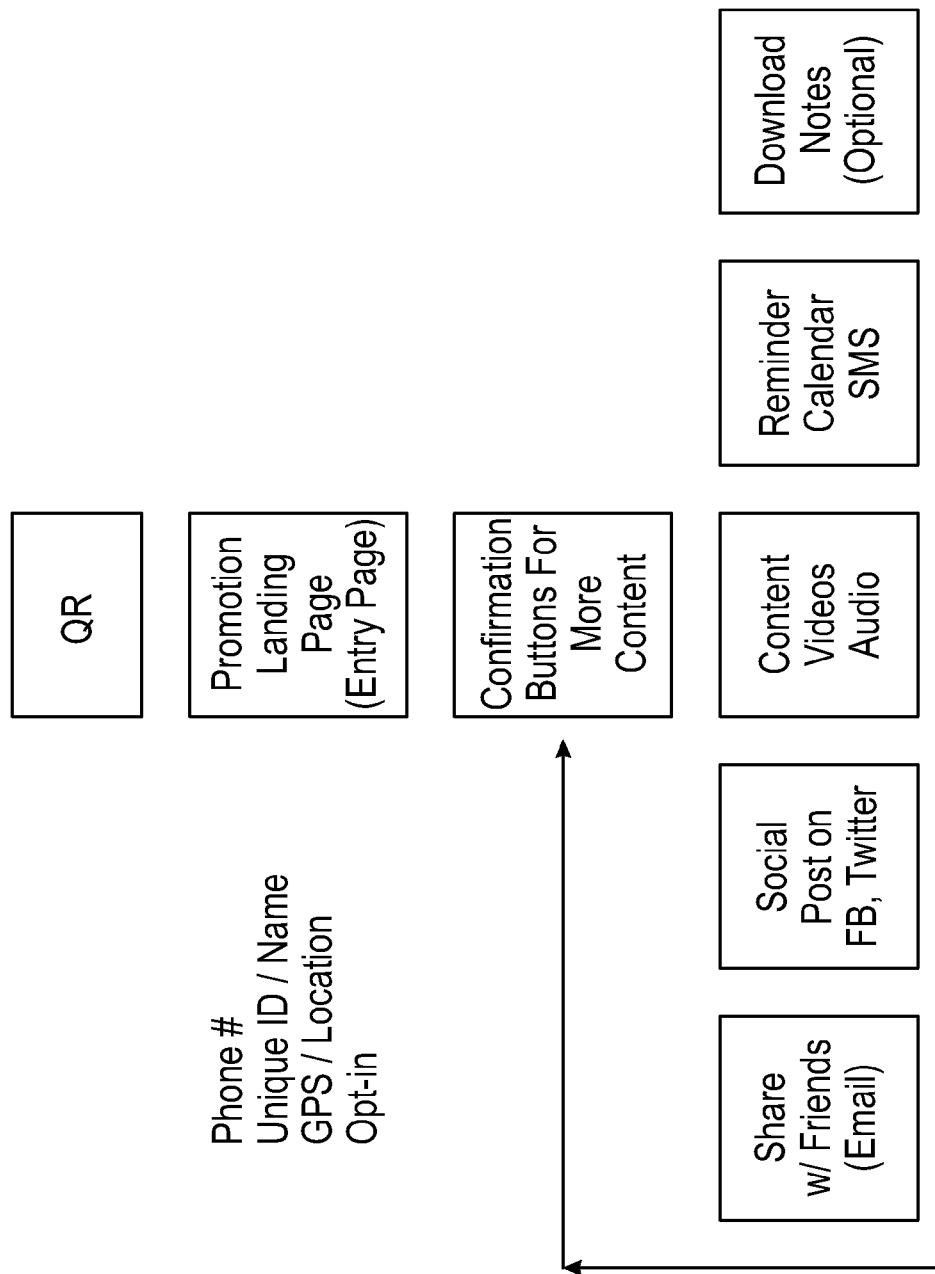
Figure 12:
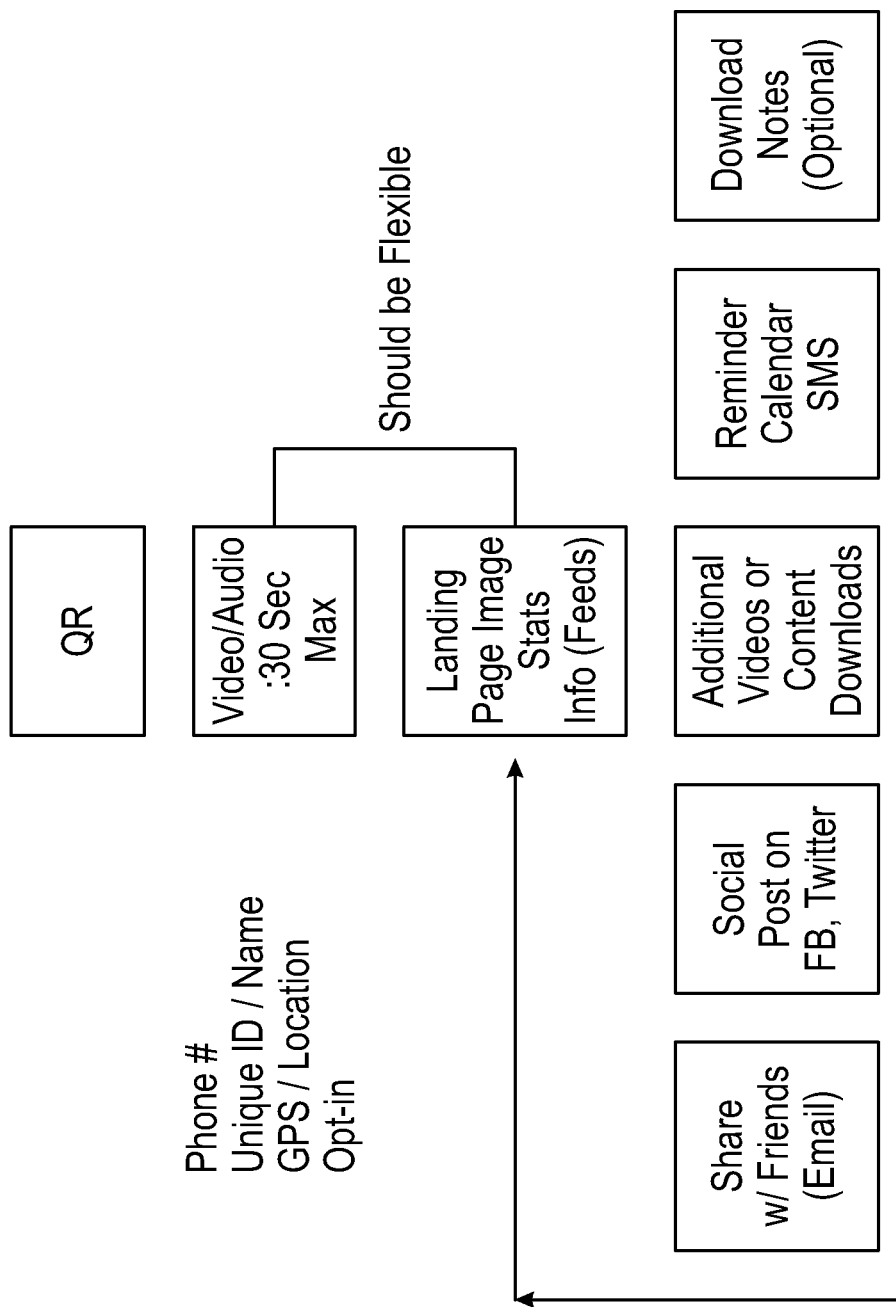

With reference to FIG. 7, a user may scan a barcode on the packaging of a product using a client application on a device of the user. The client application will decode or translate the barcode into a URL, and either retrieve or caused to be retrieved a webpage comprise one or more offers. For instance, as shown in FIG. 7, the user may be offered an opportunity to join a loyalty program associated with the product or the retailer, producer or manufacturer of the product. In this case, the user may be prompted to input personal or registration information, such as the user's name, email, and password. The user may also be prompted to invite an acquaintance to join the program or to send a coupon or some other message to the acquaintance, for example, by inputting the acquaintance's email address.

In some embodiments, the barcode generated by the system is unique, such as would desirable in the labeling of multiple products. For example, the application 12 may include a random number generator, which is applied to create unique matrix barcodes. The unique barcodes can be used to track the distribution of products in specific regions. For example, the application 12 can detect the location or region where each unique barcode is scanned. Alternatively or additionally, a random number generator can be used to select winners of sweepstakes and promotions. For instance, as barcodes are scanned and the data embedded in the barcodes transmitted to application 12, a random number generator can be used to select winning barcodes.

In some embodiments, a client application on the user devices 10 and 14 may comprise a RFID detector (e.g., nano or standard). The client application may automatically detect an RFID chip placed on a poster, product, store, or the like, for example, when the user is in the vicinity or area of the RFID chip. The client application may automatically, or after prompting and receiving authorization from the user, retrieve information related to the RFID chip. For instance the RFID chip may transmit information or data (similar to the data embedded in barcodes) which may be used to retrieve information (e.g., via the Internet).

In some embodiments, the application 12 may track and report events. These events may include, but are not limited to, barcode generation, barcode scanning, interactions, downloads, RFID detection or response, etc. Information gathered for these events may include date, time, and location. The application 12 may include an API to tie into other reporting systems for clients, agencies, etc. For instance, the application 12 may interface with a mapping application to generate reports which include maps with markers to show clusters of events/users. Such a report may aid in determining the best target regions or demographics for a product.

Figure 39:
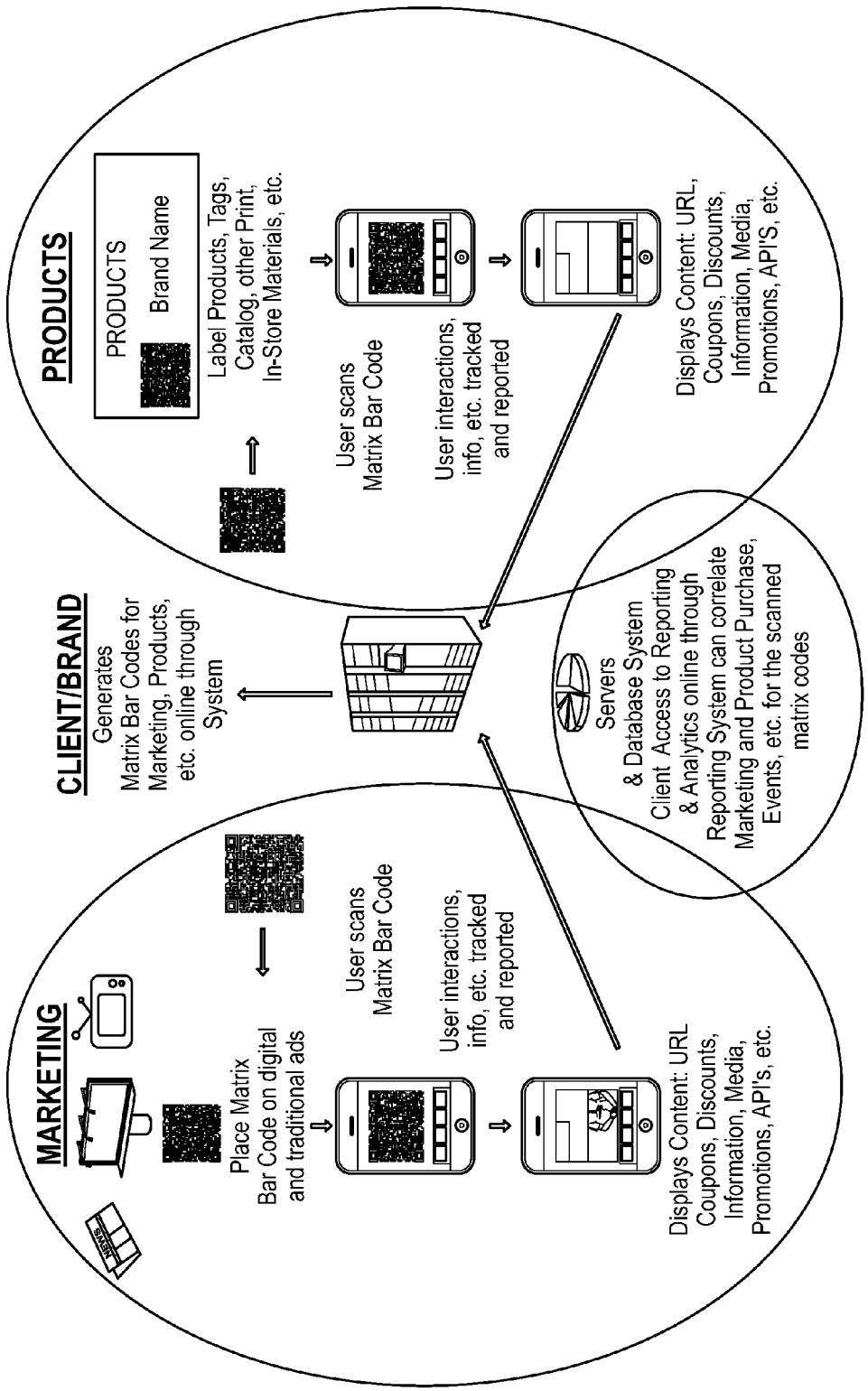
FIG. 39 is a high-level diagram illustrating barcode correlations from products to marketing initiatives, according to an embodiment.

With reference to FIG. 39, a high-level diagram illustrating various matrix barcode correlations from products to marketing initiatives is shown. FIG. 39 illustrates how barcodes on various marketing material and products can be used to gather various information and provide various feedback and content, as well as how information related to the scans and the user scan be gathered, analyzed, correlated, and reported by the server associated with application 12. For example, the system (e.g., application 12) may generate a first matrix barcode (e.g., Quick Response (QR) code, 2D code, etc.), which may be placed on a digital or traditional advertisement (e.g., newspaper, magazine, outdoor, television, Internet). A user may scan the first matrix barcode using a client application on a user device to capture an image of the barcode as it appears on the advertisement. The client application or other application (e.g., browser) may then interact with (e.g., send a request to) content server 16 or another system via the network 100 (e.g., the Internet). This interaction may be recorded or otherwise tracked by content server 16 or other system. In this manner, the first matrix barcode may be tracked (e.g., by application 12) as part of an advertising campaign in a reporting system.

A second matrix barcode may be located on the actual products that are associated with the advertising initiatives which involve the advertisements comprising the first matrix barcode. A user may scan this second matrix barcode that was generated by the system, again using the client application of a user device. The client application or other application may then interact with content server 16 or another system, and this interaction may be recorded or otherwise tracked by the system.

In some embodiments, the system is able to correlate the interactions with marketing material (e.g. from the first matrix barcode information) to interactions with the product (e.g. from the second matrix barcode information), including purchases of the product and/or interactions with the product or product's packaging. For example, when a user scans a barcode, the client application or other application, in addition to sending a request (e.g., comprising the data embedded within the scanned barcode) to content server 16 or other system, may also send an identifier of the user. In order to protect the privacy of the users, user identifiers can be generated for each user so as to be anonymous and contain no personal identification information. In this manner, each recorded interaction may also be associated with a user identifier, and the system may determine which interactions are associated with a single user by identifying those interactions that are associated with identical user identifiers.

In an embodiment, the system (e.g., application 12) can determine that a user has purchased a product by identifying that a scanned barcode was placed inside the product or product packaging. This information can be embedded within the barcode (e.g., a URL which is dedicated to receiving messages comprising purchase interactions can be encoded in the barcode) or otherwise associated with the barcode (e.g., as a row in a database). Since the barcode was placed inside the product or product packaging, it can be assumed that a user who has scanned the product has purchased and opened the product.

Using the systems and methods described herein a user can create a smart barcode that can then be used to provide the services and features described herein. The smart barcode can then be embedded in advertising or marketing material including print materials, online materials, news papers, magazines, and the like, as well as placed on products or product packaging. A barcode scanner can then be used to scan the smart barcode. The barcode scanner can be a generic scanner or it can also be branded by the user. For example, if the user is a large company with a lot of products, the user can brand their own barcode scanner application. For example, Starbucks® or Puma® may have their own barcode scanner applications.

The barcode scanner application may be downloaded as an application, e.g., onto a cell phone, smart phone, tablet device, or any device with a digital camera and an Internet connection. For example, FIG. 17 are screen shots of a smart phone that uses a generic smart barcode scanner. As illustrated on the right hand side of FIG. 17, when the user activates the scanner, the camera function is launched and the user can be instructed to center the barcode (e.g., from a product or in advertisement) within the view finder for the camera. The user can then take a picture of the smart barcode as illustrated in FIG. 20.

Once the user captures the image, the data embedded within the barcode can be decoded by barcode scanner application or other client application and transmitted to barcode content application 12 where the data can be processed, tracked, and/or stored. For example, the data can be used to recognize and associate the barcode with the correct company or source, e.g., Starbucks® or Puma®. Application 12 may also perform several steps associated with the barcode and/or as dictated by the source. For example, application 12 can store the time that the barcode was scanned, identifying data (e.g., a cell phone number or other user or user device identifier), and/or a location of the user or user device (e.g., using GPS data provided by or acquired from the user device). Application 12 may also determine and/or store the type of material from which the barcode was scanned (e.g., advertisement, product, packaging, etc.).

A different barcode may be created for each media type or outlet. In other words, one barcode may be created for advertisements in the New York Times®, while another is created for a particular magazine, and another for online advertisements. Thus, application 12 can determine where the user saw the barcode that was scanned. On the other hand, specific products may all have the same barcode. For example, all of a certain type of shoe may have the same barcode. In other embodiments, the barcode on a particular type of product can be different depending upon the location of the product. Thus, by processing the data embedded in the barcode, application 12 can determine what product the user was looking at when he or she scanned the barcode as well as the user's location (e.g., the particular store in which the user scanned the barcode). The store location can also, or alternatively, be determined using GPS data. All of this information may be stored in database 80.

In this manner, a history can be maintained (e.g., for each user as identified by a unique user identifier) to track when and where the users see certain advertisements, whether they follow up and view the products, whether they purchase those products, etc. All of this information can be stored and archived for the company or source in database 80 or another database or databases. Reports can then be accessed or generated for the source conveying this information. This allows the source to determine where advertisements were seen, how often these views were converted into purchases, where those purchases were made, etc.

Application 12 can also include or be configured to work with analytics that allow the source to optimize their advertising and product placements based on the information gathered from and conveyed by users scanning the barcodes. For example, the source may realize that few people are viewing their advertisements in a certain publication or publications, or, even if many people view the advertisements, that few of those individuals actually make a purchase. Conversely, for example, a source may determine that, while relatively few people view an advertisement in a particular publication, the conversion rate (i.e., the rate of individuals who purchase the products relative to the individuals who view the advertisements) for those individuals is very high. Such information can then be used by the source to optimize their advertising and/or product placement and distribution.

Application 12 may have access to information across multiple products and companies. This information can be used to further optimize marketing campaigns and product placement. For example, all of a user's scans across different types of products and advertisements for a whole host of products and brands can be stored in database 80. Based on this information the application 12, other system, or the source may determine correlations between products and advertisements. For instance, it may be determined that users that purchase the products of one company also purchase the products of another company. This knowledge may be beneficial to a source, which may modify its marketing to take advantage of this correlation.

Figure 19:
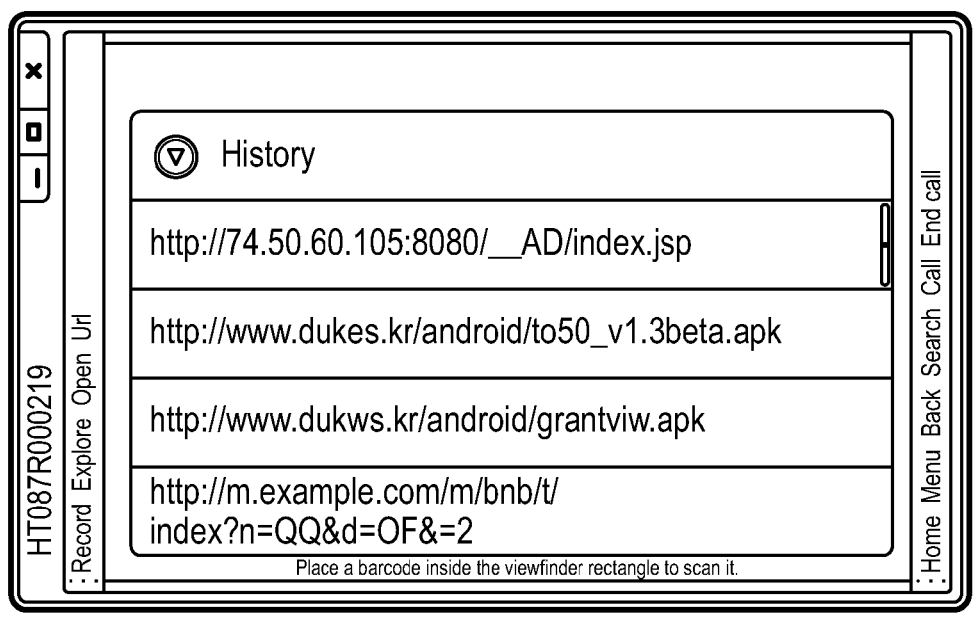
Figure 25:
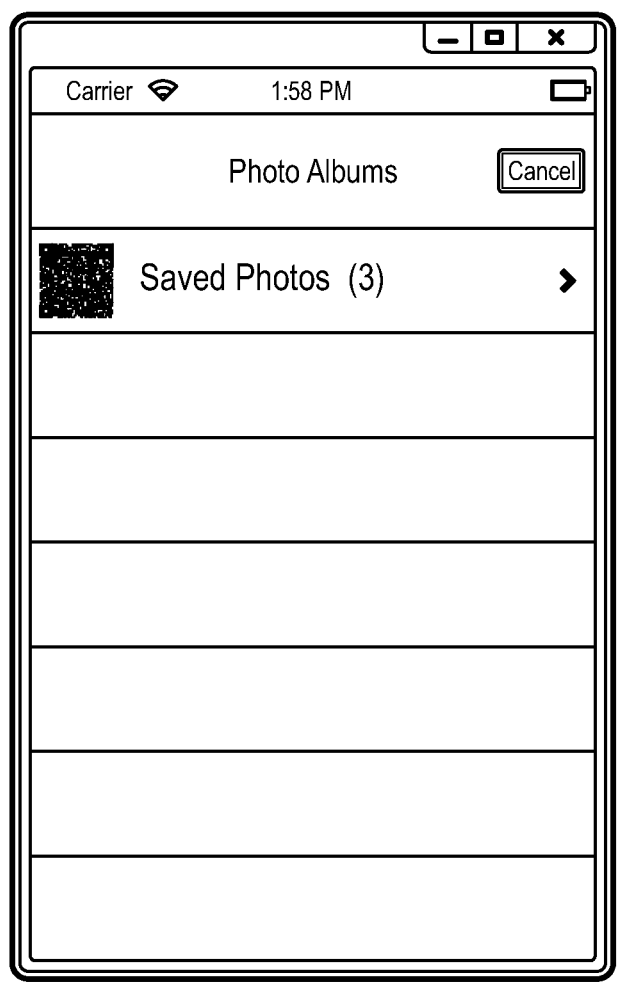
Figure 26:
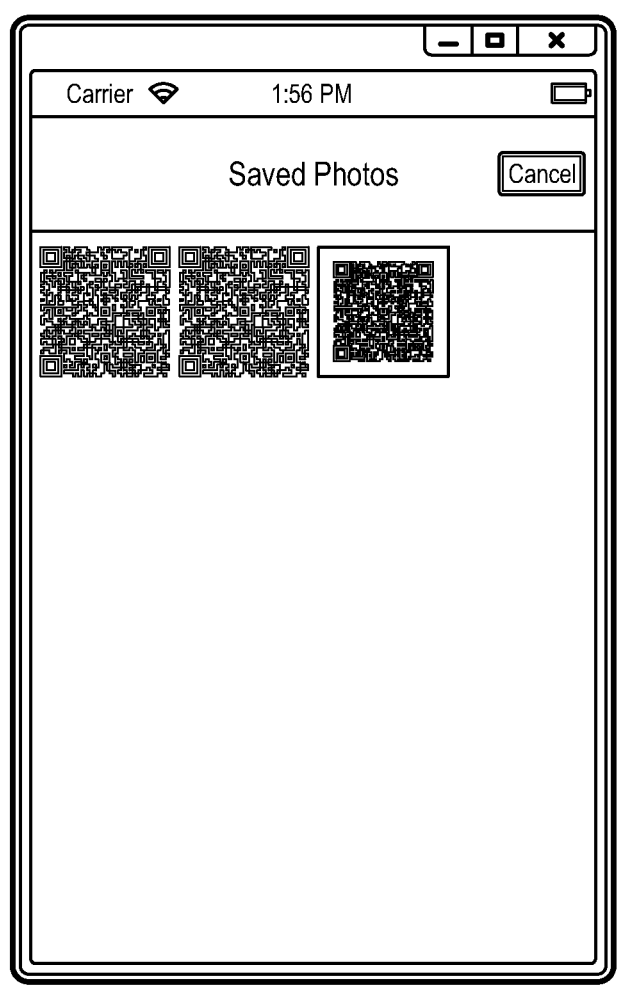

In an embodiment, the user can access a history of his or her scans. As illustrated in FIGS. 19 and 27, this history may be stored as the translated data embedded within the corresponding barcode. In embodiments in which the translated data comprises URLs or other references, the user may select the data to revisit the URL or follow the reference. Alternatively or additionally, the user may be able to access a history of the scanned barcode images themselves, as illustrated in FIGS. 25 and 26. In such an embodiment, the images may act as icons representing the data embedded within the barcode. If the data comprises a URL or other reference, when a user selects a barcode image within the history, a client application (e.g., browser) may retrieve information from the URL or other reference.

The user can be provided with the option to access information relative to the associated product or service being advertised, share information related to the product or service, share such information along with a message, etc. For example, when a user scans a smart barcode using a scanner application as described herein, the user can be presented options as illustrated in FIG. 20. One option can be to open a browser to access further information. This can connect the user with a server hosting application 12, connect them with the company's website, or connect them with the company's website through the server associated with application 12.

Figure 16:
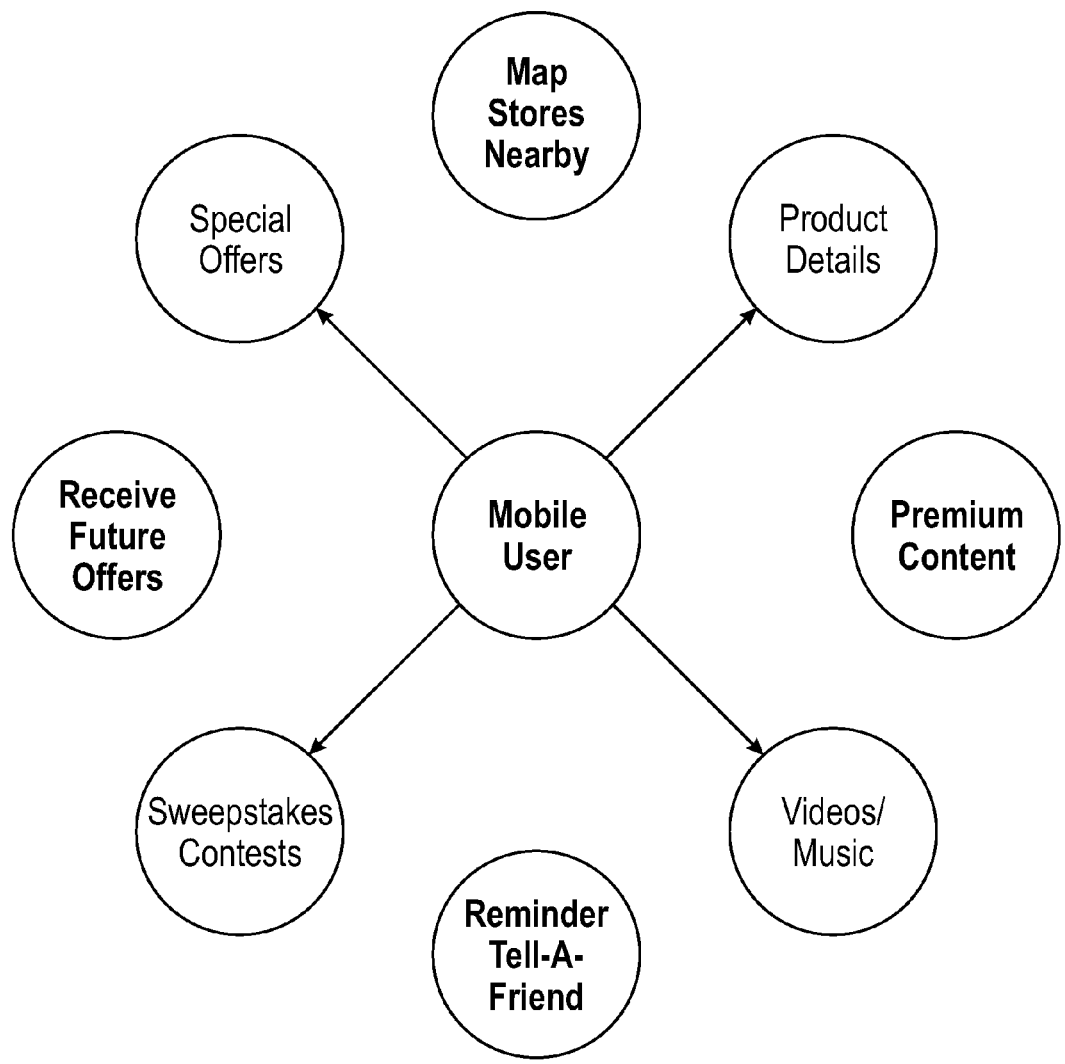
FIG. 16 illustrates some of the content that can be associated with a barcode and presented to a mobile user, according to various embodiments.
Figure 18:
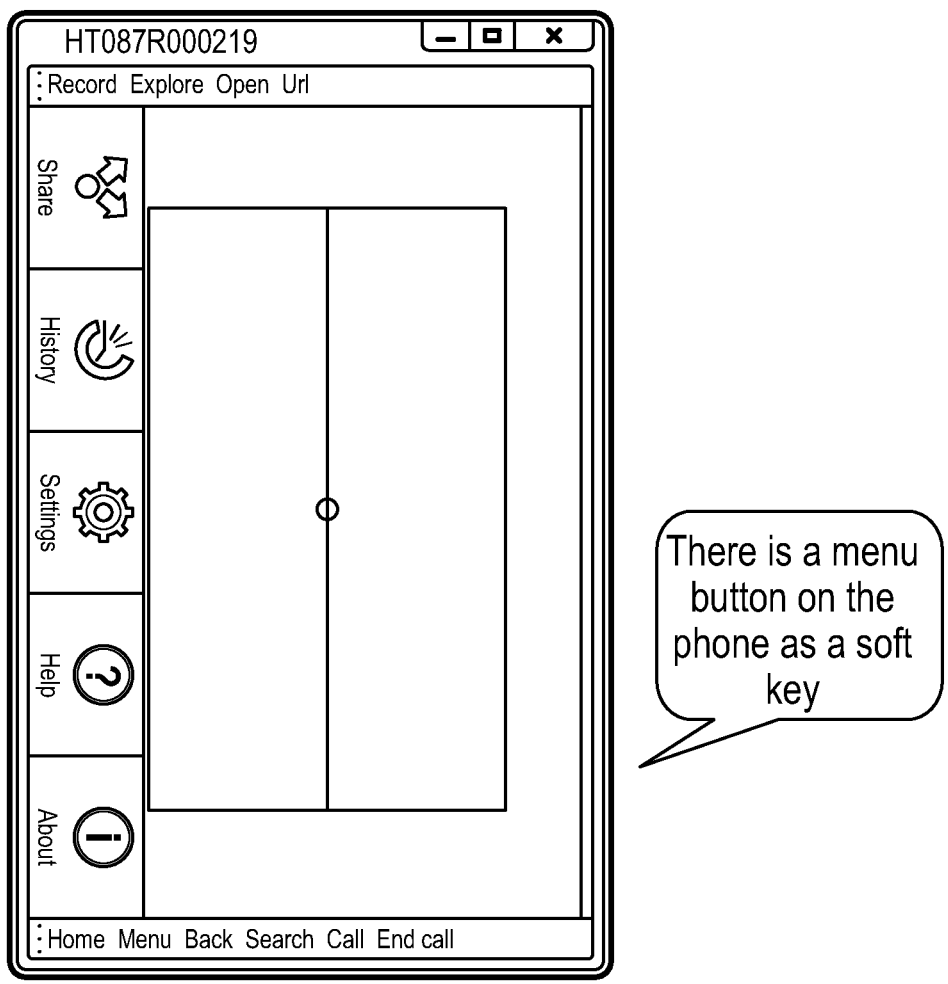

The user may then be provided information, coupons, future offers, discounts or other special offers, maps to nearby stores, product details, sweepstakes information, or other premium content as illustrated in FIG. 16.

Figure 21:
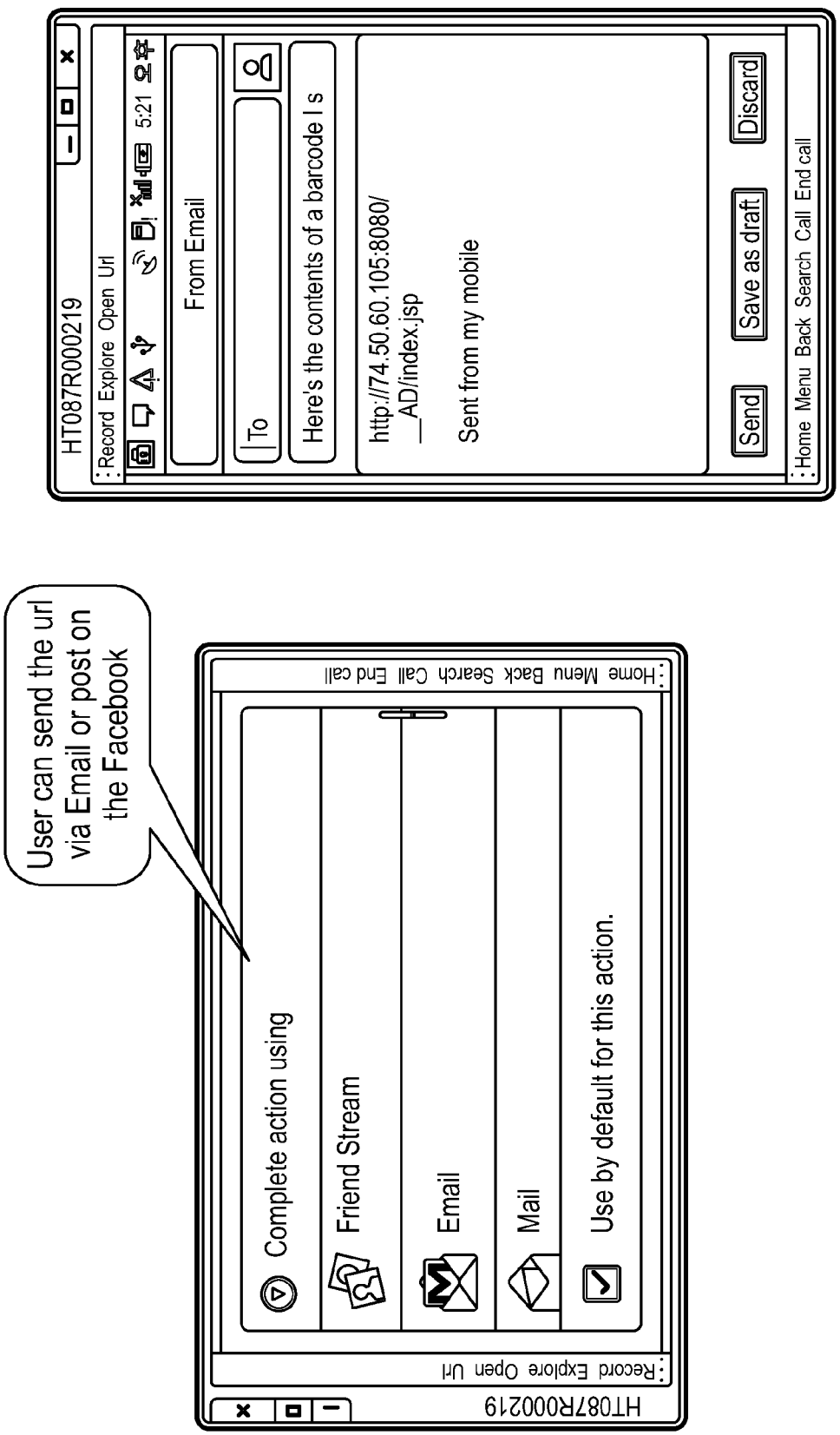
Figure 22:
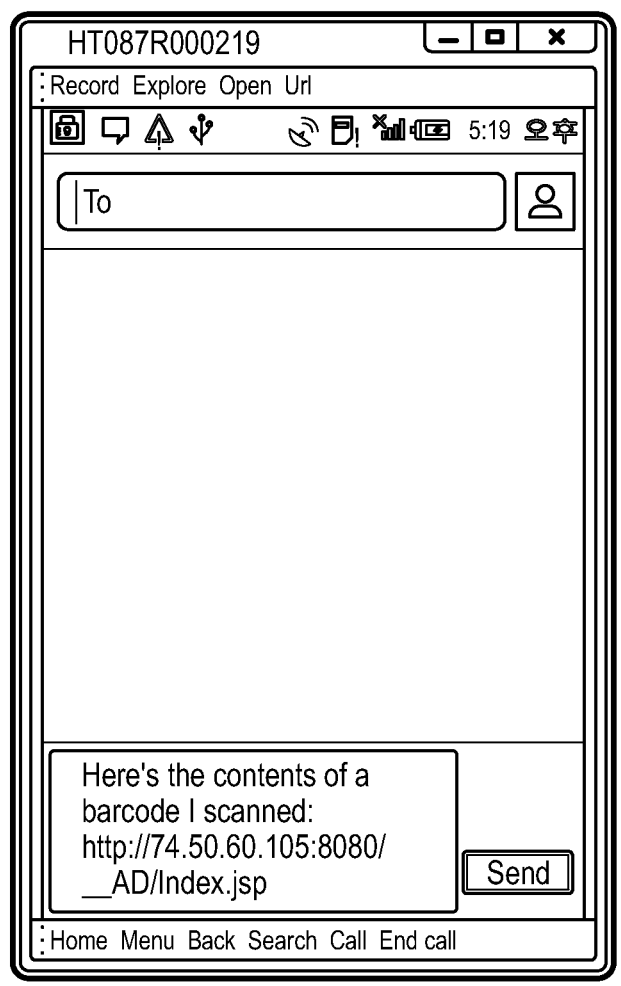
Figure 23:
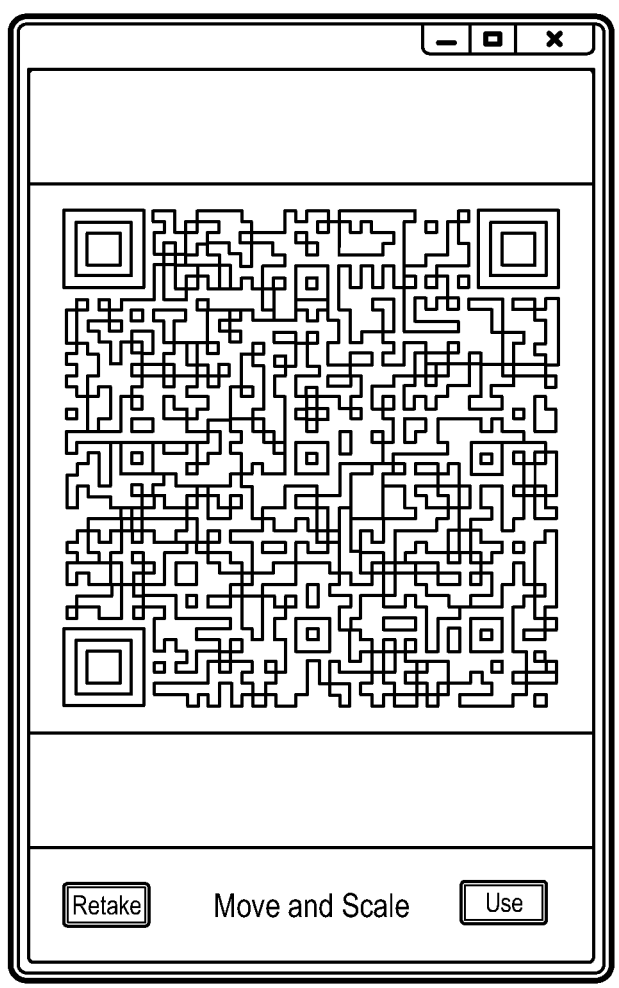
Figure 24:
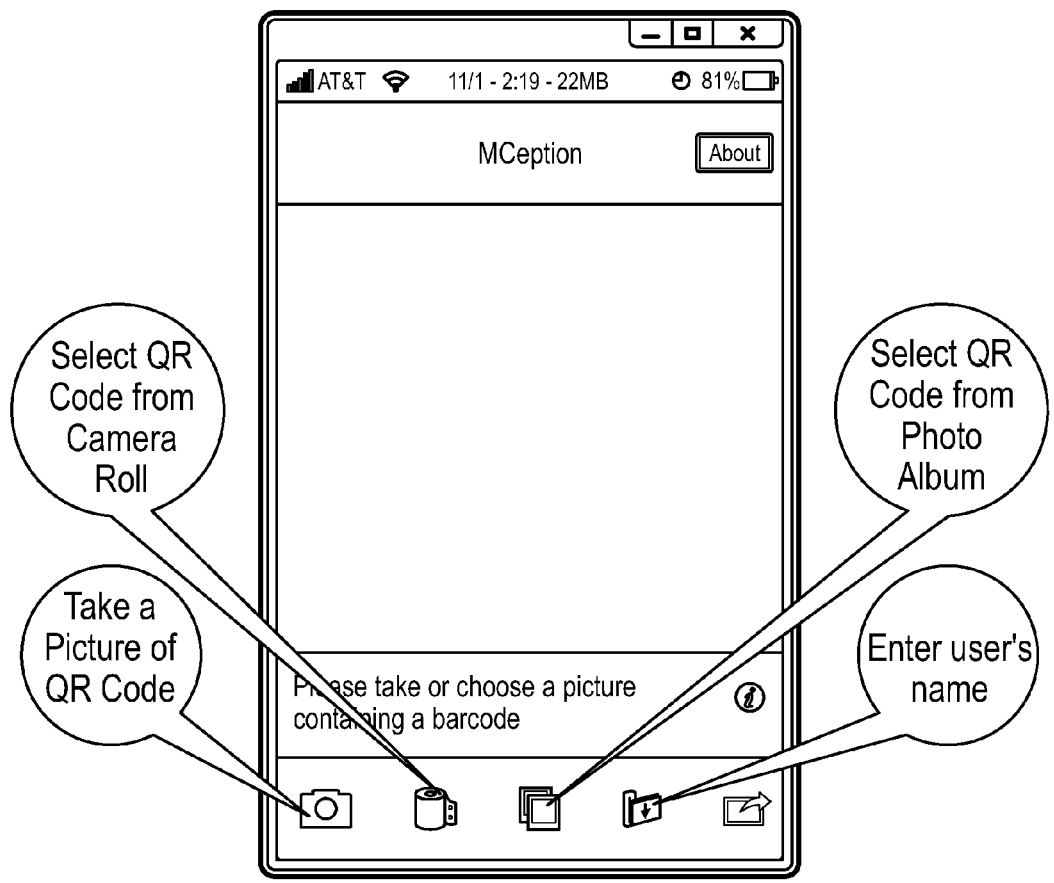

The user can also forward and share a URL embedded within a barcode via email, SMS, a post to a social network (e.g., Twitter®), etc., as illustrated in FIGS. 20 and 21. The user may also include a message with the forwarded URL or other information associated therewith, as illustrated in FIG. 22.

The barcode can also act as a key to a portal that can include other applications associated with a product or service and/or the source of the product or service. This portal can be hosted by the content server 16 or other server associated with application 12. For example, as illustrated in FIG. 7, when the user scans a smart barcode associated with Starbucks®, it can take them to a Starbucks® portal where they have the opportunity to join the Starbucks® fan club, share something related to Starbucks® with their friends, etc. There can, for example, also be a map application that displays other nearby Starbucks® stores. FIGS. 8-15 illustrate some of the steps and applications that can be involved with a portal.

FIGS. 37A-37G illustrate some of the content and options that can be presented to users when they scan a smart barcode. A user may scan a barcode using a barcode scanning application residing on a user device 10. The barcode scanning application may translate the barcode into data comprising a URL. The barcode scanning application or other client application (e.g., browser application) may then retrieve content from the Internet using the URL.

Figure 37A:
FIGS. 37A-37G illustrate an example series of screenshots for content associated with a barcode, according to an embodiment.

As shown in FIG. 37A, the content may be an interactive webpage which provides one or more options to the user. For example, the webpage may comprise a user interface which provides the user with options to view or listen to digital media content (e.g., video, audio, etc.), join a loyalty program or social group, and share content with one or more acquaintances.

Figure 37B:
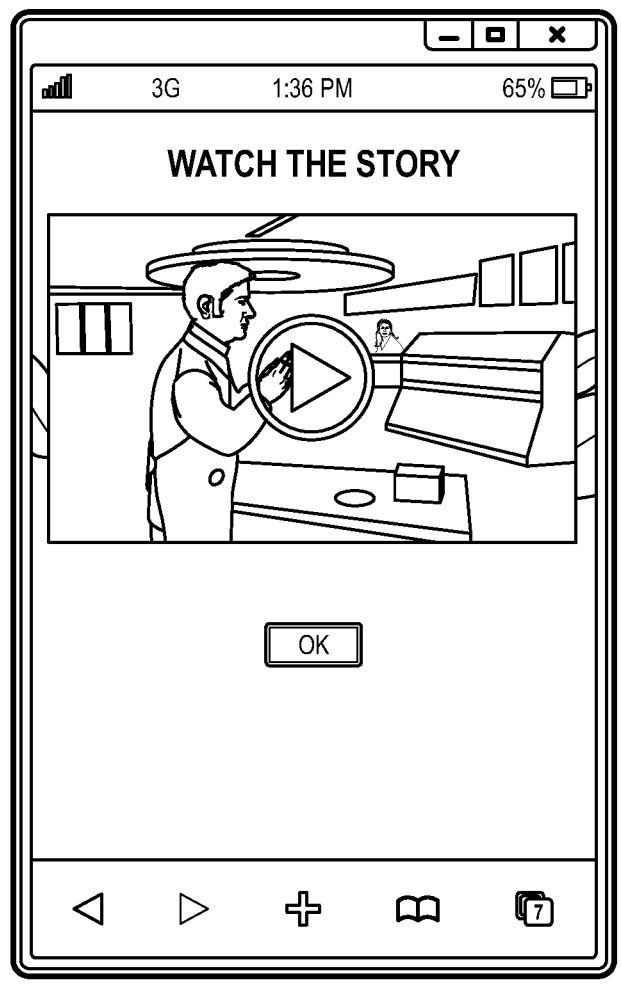

If the user selects the option to view digital media content (e.g., by selecting a hyperlink), the client application may retrieve the digital media content (e.g., from content server 16), as shown in FIG. 37B.

Figure 37C:
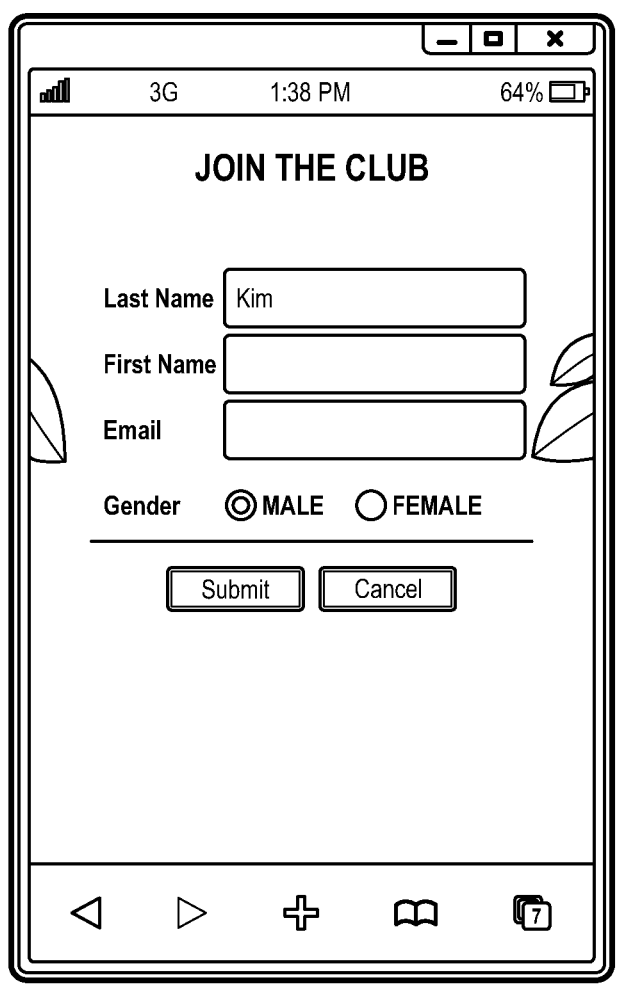
Figure 37D:
Figure 37E:

If the user instead or also selects to join a loyalty program, the client application may retrieve a user interface comprising inputs for entering information related to the user. As shown in FIG. 37C, input text boxes may be provided for entering the user's name, email address, and the like, and/or radio buttons can be provided for the user to specify other information, such as his or her gender. Once the user enters the requested information, the user may submit the information to content server 16 or other server, for example, using an HTML post request. An account can be created for the user, and the user's information may be stored (e.g., in database 80) for future retrieval. As an incentive or reward for joining the loyalty program, the user may be provided with a coupon after joining the loyalty program. For example, after submitting the user's information, the client application may be directed to a coupon or the user may be prompted to download a coupon, as shown in FIGS. 37D and 37E.

Figure 37F:
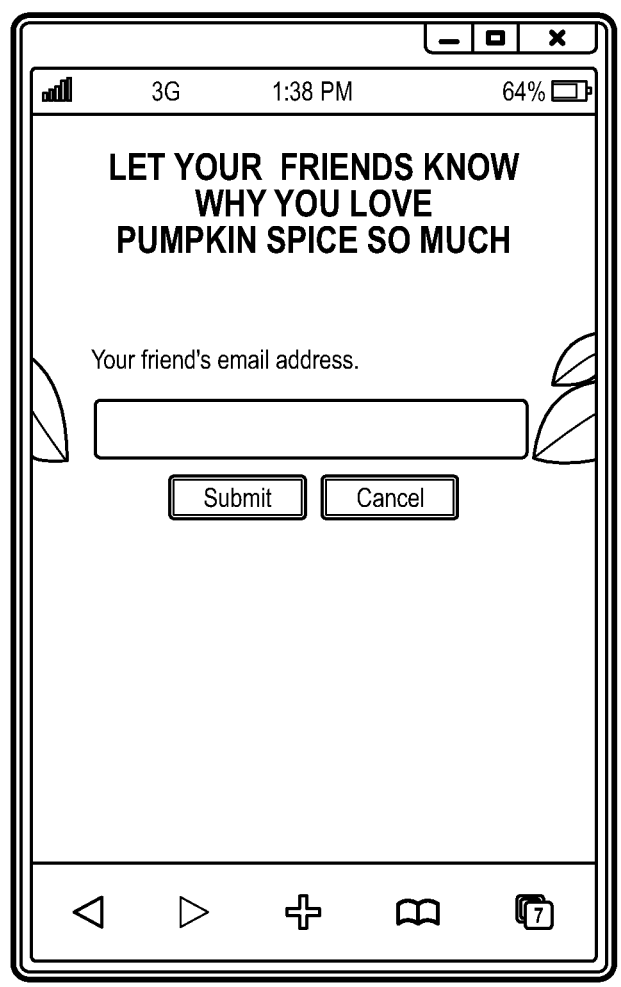
Figure 37G:

The user may also select to share content or other information with an acquaintance. The client application may retrieve a user interface which prompts the user to enter the email address of an acquaintance, as shown in FIG. 37F. After the user enters the requested information and submits the information to content server 16 or other device, the client application may retrieve or be directed to another user interface which prompts the user to enter a message, as shown in FIG. 37G. The user may enter text and submit the message to content server 16. In an embodiment, the content server 16 may then generate and send an email message comprising the submitted message, and optionally other information, to the specified email address.

Figure 38A:
FIGS. 38A-38F illustrate an example series of screenshots for contentassociated with a barcode, according to an embodiment.
Figure 38B:
Figure 38C:
Figure 38D:
Figure 38E:
Figure 38F:

FIGS. 38A-38F illustrate another example of some of the content and options that can be presented to users when they scan a smart barcode. A user may scan a barcode using a barcode scanning application residing on the user's device. The barcode may be located, for example, on a product, product packaging, a receipt, an advertisement, etc. The barcode scanning application or another client application on the user's device may translate the barcode and, based on the information from the translated barcode, retrieve a webpage (e.g., from content server 16). In an embodiment, this webpage may offer the user the opportunity to enter a contest, such as a sweepstakes, as shown in FIG. 38A. If the user chooses to participate in the contest, the user may be prompted to enter identifying information, such as a name, email address, and Zip Code, as shown in FIG. 38B. In addition, the user may be prompted to invite an acquaintance to participate in the contest as well, for example, by providing the acquaintance's email address, as shown in FIG. 38C. The content server 16 may also allow the user to view other user's comments, as shown in FIG. 38D, or enter the user's own comments. In addition, content server 16 may also provide the user the option to download a coupon, as shown in FIGS. 38E and 38F.

FIGS. 29-35 illustrate how the discloses systems can be used to create a personalized message or message share content for a Valentine's Day card or gift. The user may purchase a card or gift on which a barcode has been printed or otherwise attached. For instance, the retailer, packer, or manufacturer may have affixed a unique matrix barcode to the card or gift.

Figure 29:
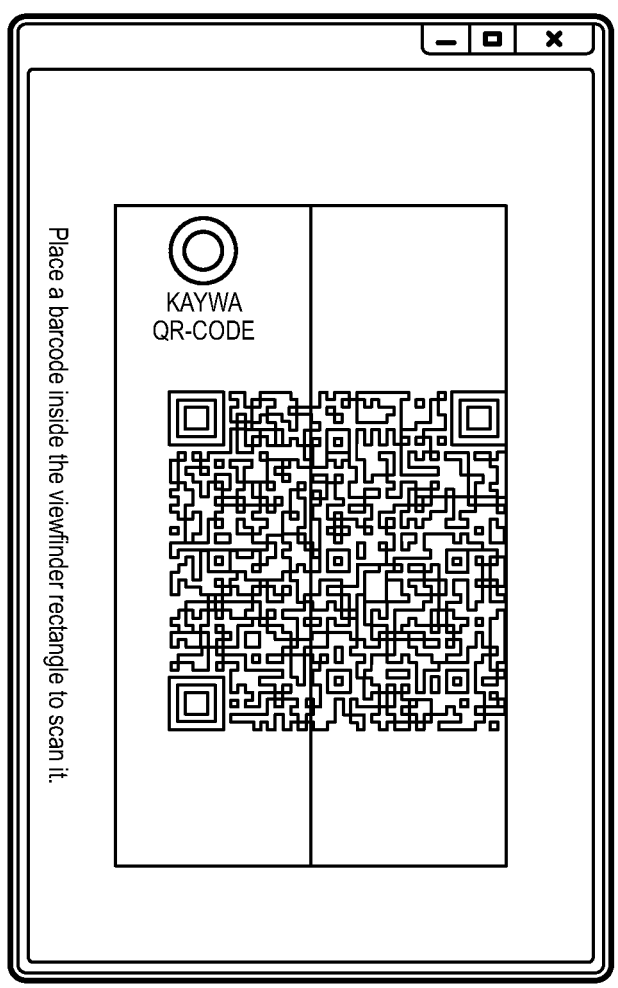
FIGS. 29-35 illustrate an example use of a barcode content application, according to an embodiment.

As illustrated in FIG. 29, the purchasing user may then scan the barcode using a barcode scanning application executed on the user's device. The barcode scanning application or other client application on the user device may then translate the barcode into its embedded data, according to known techniques. This embedded data may comprise a base URL as well as a product identifier associated with the particular card or gift purchased by the user. The product identifier may be unique. A client application, such as the barcode scanning application or a third-party browser, may then request content from the URL which may be combined with a query string comprising the unique product identifier, as well as other information (e.g., a user identifier). The URL may identify a resource hosted on content server 16.

Figure 30:
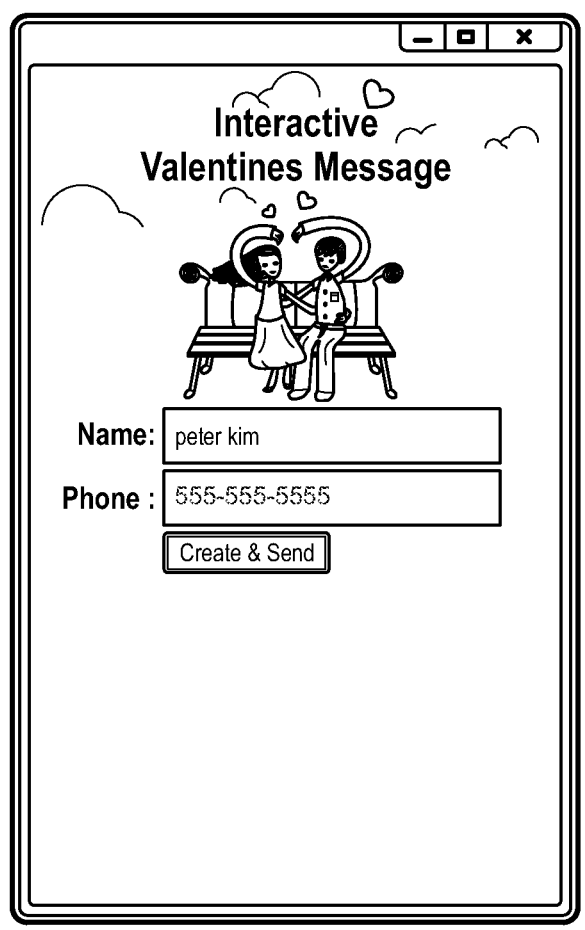
Figure 31:
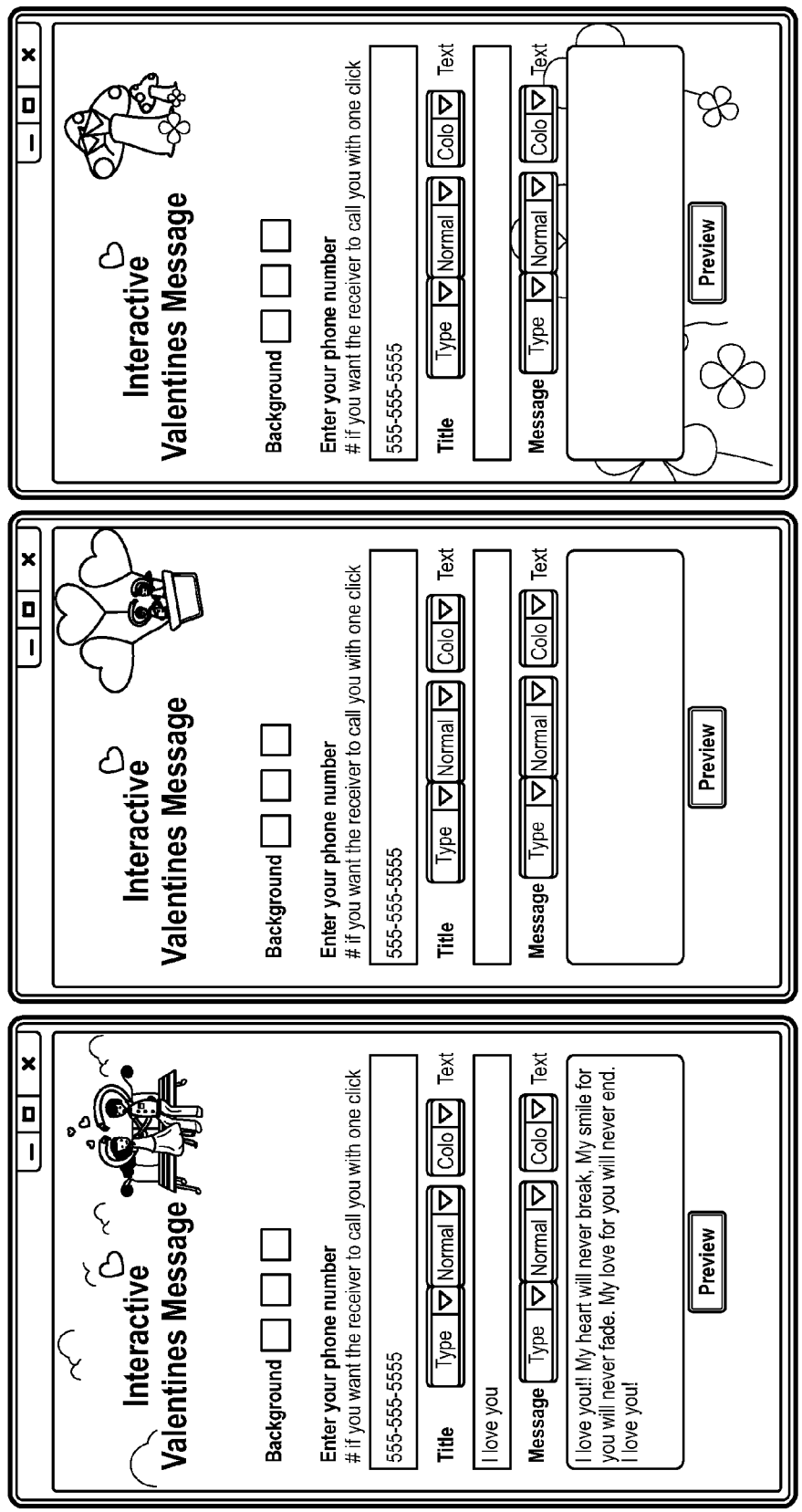
Figure 32:
Figure 33:

As illustrated in FIG. 30, content server 16 may return content based on the request from the client application on the user device. When the barcode is first scanned, the content may comprise a message creation application or interface. For example, the interface may prompt the user to enter identifying information, such as the user's name and phone number. As shown in FIG. 31, the message creation interface may enable the user to choose a background and background color, and enter a title for the message, as well as enter the message itself. In an embodiment, the message creation interface also allows the user to specify that the recipient of the message should be permitted to call or text the user with one click, for instance, by clicking a button placed within the body of the message. The message creation interface may enable the user to preview the message, as shown in FIG. 32, and to either finalize or continue to edit the message. Once the user chooses to finalize the message, the user may be notified that the message has been saved or otherwise store, as shown in FIG. 33. The user may also be issued a coupon, for example, as an appreciation by the manufacturer or retailer of the purchased gift.

Figure 34:
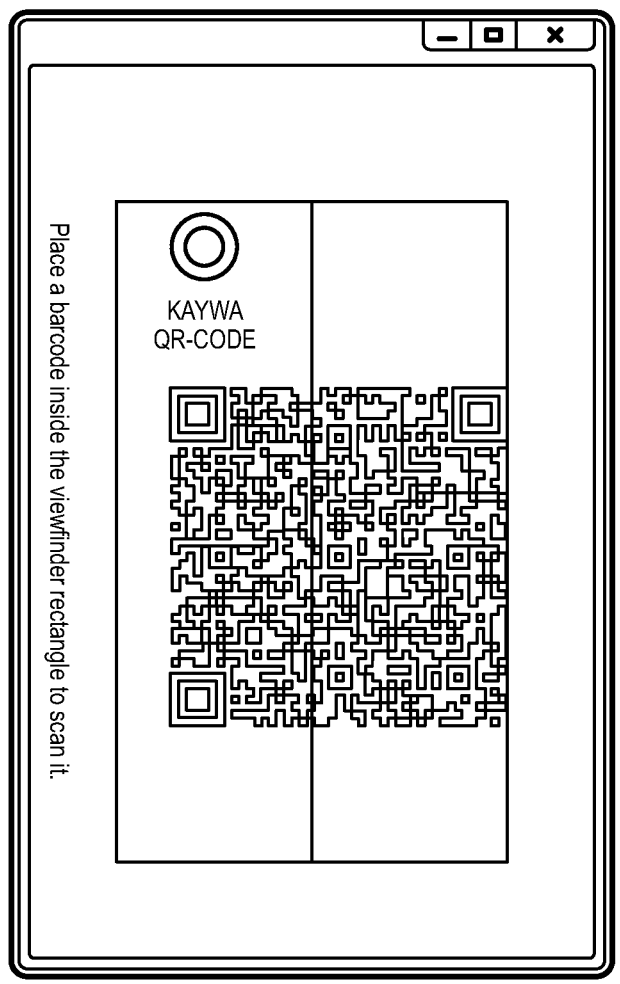
Figure 35:

Once the user finalizes the message, and/or after a predetermined time or predetermined number of edits, the application 12 associates the barcode (e.g., the URL and product identifier embedded within the barcode) scanned by the user with the finalized message. This association may be stored in database 80. The next time someone scans the barcode, the barcode scanning application or other client application will request content from the content server 16, and this time, instead of returning the message creation interface, the content server 16 will return the finalized message. Thus, the user may give his or her gift to the intended recipient of the gift, and when the recipient scans the barcode, as illustrated in FIG. 34, the recipient will receive the final message created by the gifting user, as illustrated in FIG. 35. The final message may comprise a "call sender" button which, if interacted with, will call the user device of the gifting user. The final message may also provide the recipient with a coupon or an option to download a coupon. In addition, the system (e.g., application 12) can track information via the barcode related to the sender and recipient of the gift, by recording or otherwise extracting information from the interactions of the sender and recipient with content server 16 or application 12.

Figure 28:
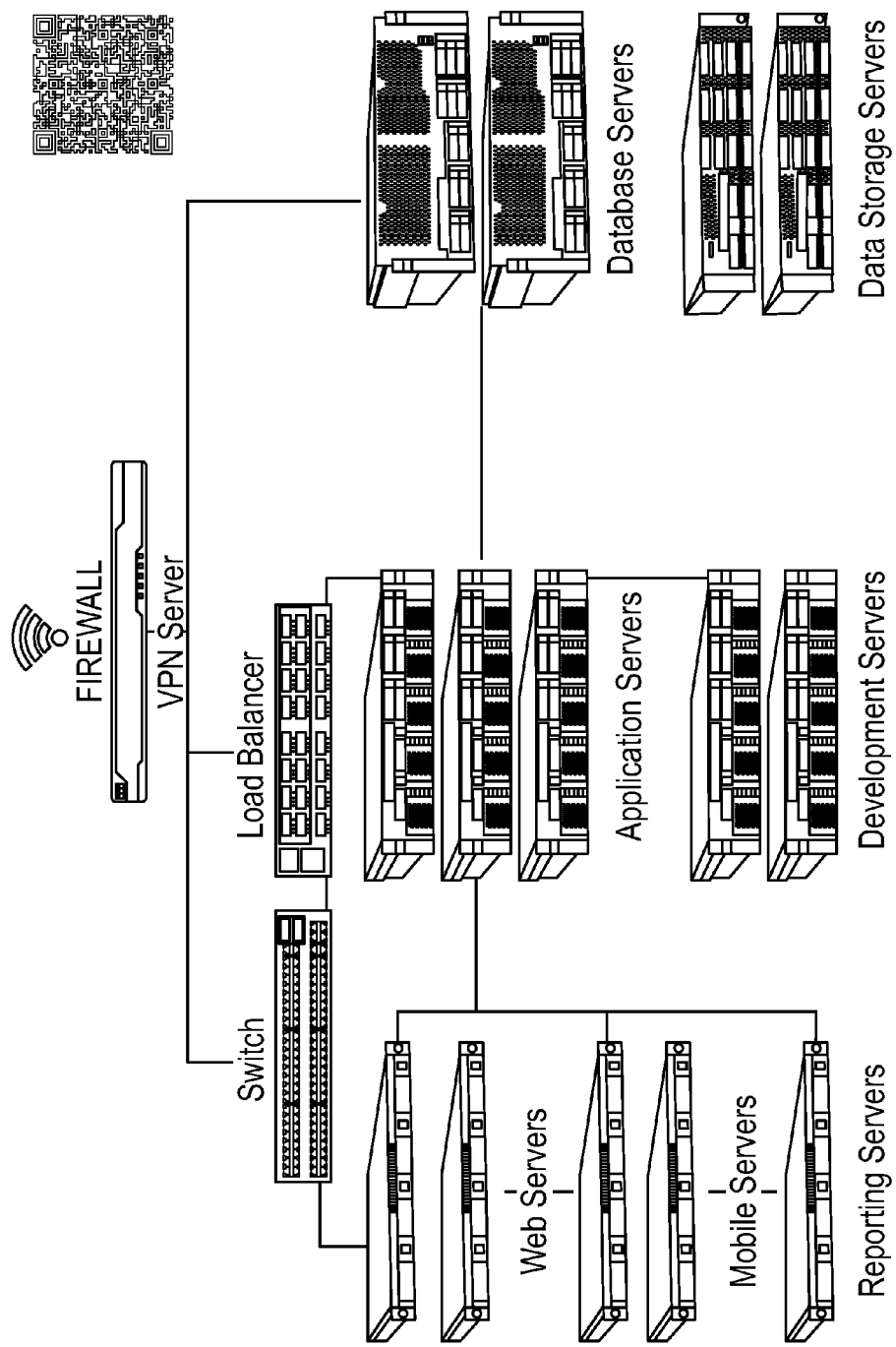
FIG. 28 illustrates hardware that may be used to implement a content server, according to an embodiment.
Figure 36:
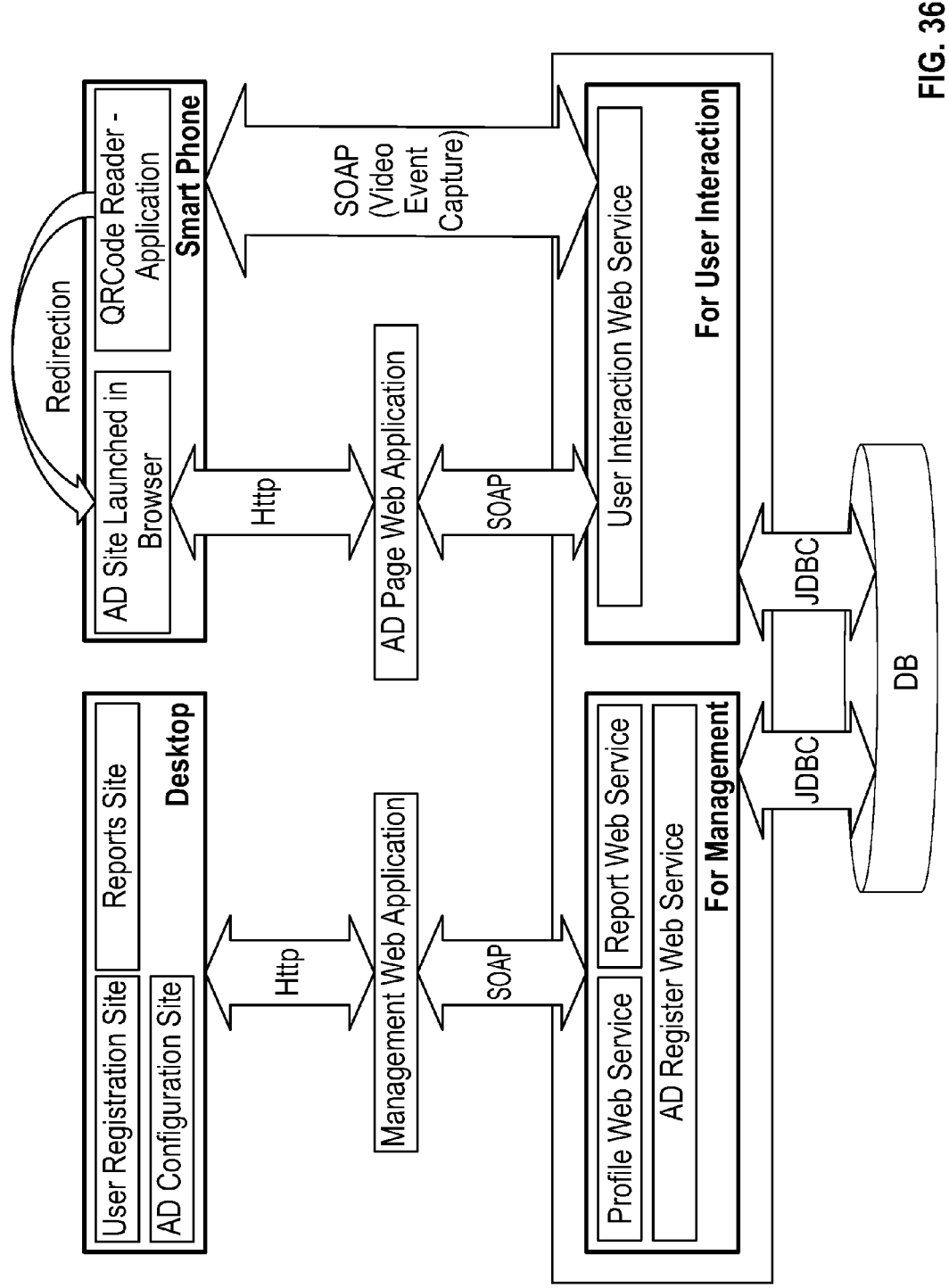
FIG. 36 is a high-level diagram illustrating the layers of a content server, according to an embodiment.

In an embodiment, the server executing application 12 (e.g., content server 16) can actually comprise a plurality of servers, hardware and/or software, and other resources, as illustrated in FIGS. 28 and 36. For example, content server 16 may comprise one or more load balancers and switches, as well as a plurality of web servers, mobile servers, reporting servers, application servers, database servers, and data storage. The content server 16 may also comprise backup data storage servers and development servers.

As illustrated in FIG. 36, a number of web services may interact with database 80, for example, using the Java Database Connectivity (JDBC) API. These web services may comprise a profile web service for managing profiles or configuration information, a reporting web service for managing reporting features, a registration web service for clients, and a user interaction web service for managing user interactions with application 12 or content server 16. Web applications may interact with these web services, for example, using Simple Object Access Protocol (SOAP). These web applications may include a management web application, which interacts with the profile, reporting, and administrative web services, and a content web application which interacts with the user interaction web service. User devices (e.g., desktop PCs, tablet PCs, smart phones, etc.) can interact with these web applications, for example, using a client application such as a web browser or barcode scanning application. These interactions between the user devices and the web applications generally comprise requests from the user devices and responses comprising content from the web applications. In an embodiment, these requests and responses are transmitted using Hypertext Transfer Protocol (HTTP).

The management web application may serve a plurality of websites, including a registration site which enables clients to register with application 12 or content server 16, a reports site which provides reports and reporting tools for clients to track user interactions with the clients' barcodes, and a configuration site which allows clients to manage their campaigns (e.g., generate barcodes, manage content, associate barcodes with content, etc.). User devices may comprise a barcode scanning application, such as a QRCode Reader, as well as a browser application. The barcode scanning application may comprise functionality for scanning and translating barcodes. The barcode scanning application may interface with the browser application so as to provide translated barcodes (e.g., comprising URLs) to the browser application. Alternatively, the barcode scanning application may itself comprise browser functionality.

Figure 40:
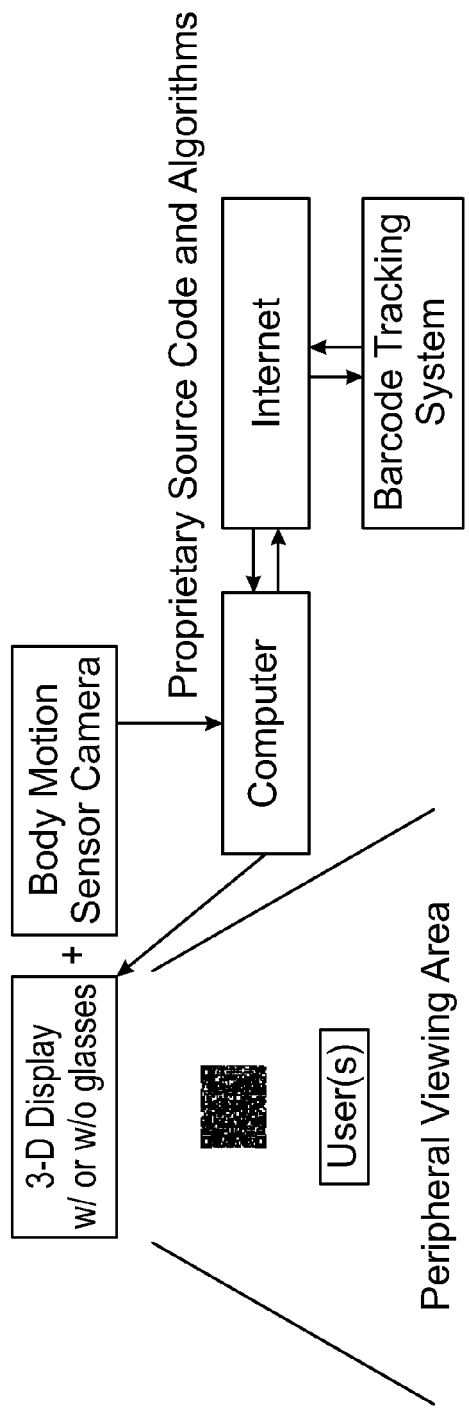
FIG. 40 is a high-level diagram illustrating a three-dimensional viewing system, according to an embodiment.
Figure 41:
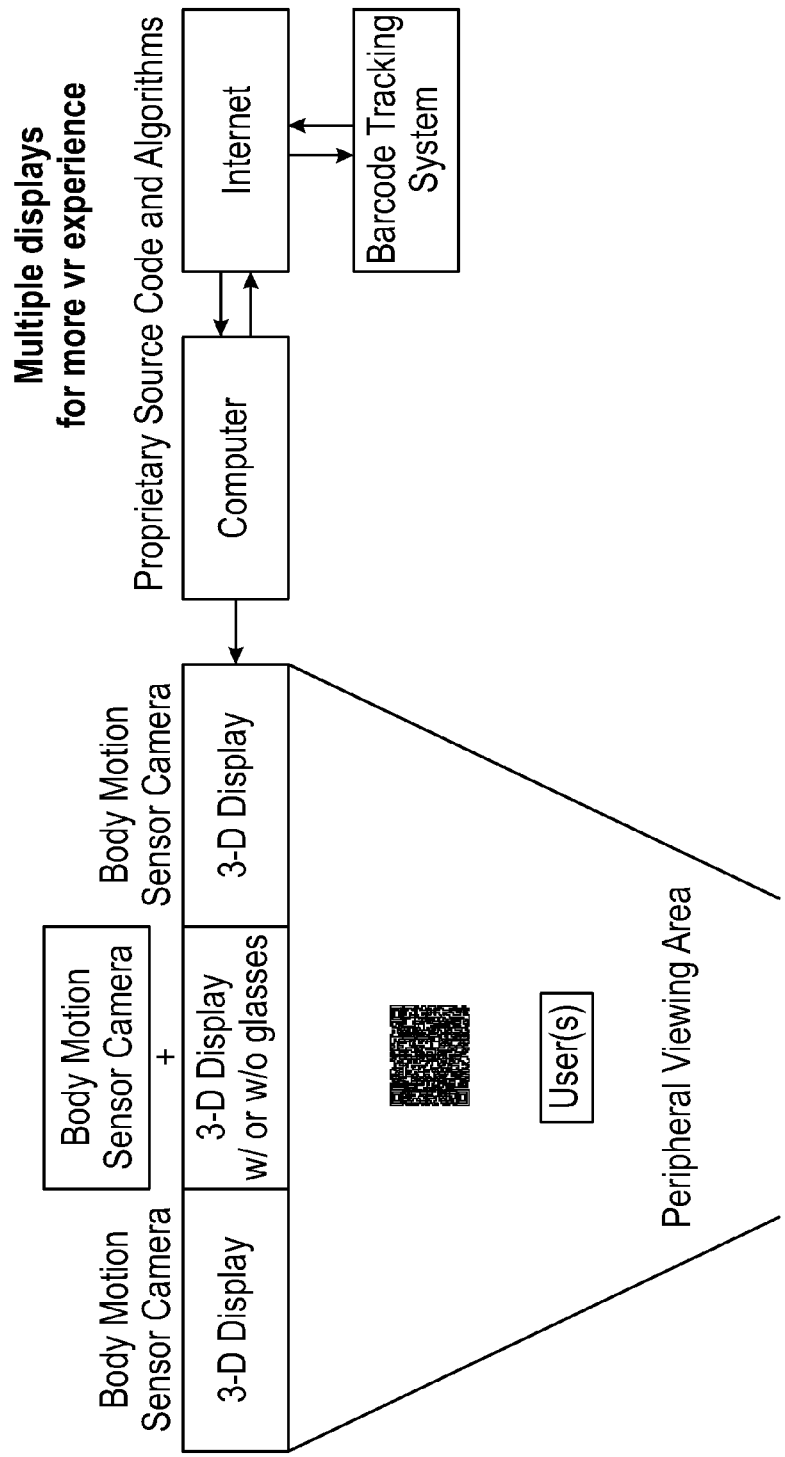
FIG. 41 is a high-level diagram illustrating an alternative three-dimensional viewing system, according to an embodiment.

The systems and methods described herein can also be used in conjunction with various sensors and output devices to generate a fuller, "4-dimensional" (4D) experience. FIGS. 40 and 41, illustrate a high-level diagram of a three-dimensional viewing system. The three-dimensional viewing system preferably allows a user to experience an interactive 3D (i.e., 4D) or "virtual reality" experience. The main difference between the embodiments shown in FIGS. 40 and 41 are the peripheral viewing areas of the user. In the embodiment shown in FIG. 40, the peripheral viewing area of the user is narrow, whereas in the embodiment shown in FIG. 41, the peripheral viewing area of the user is wide and may comprise multiple displays at multiple angles relative to the user, so as to at least partially enclose the user within the displays. While FIGS. 40 and 41 illustrate embodiments having a 3D display or displays, the 3D aspect of the displays are optional, as a conventional 2D display may be used as well.

The 3D viewing system may be implemented on any suitable type of computer system such as a smartphone, a mobile phone, a desktop or laptop computer, a gaming console, a server, etc. The 3D display(s) may comprise a television, monitor, projector, etc. The display(s) may be capable of displaying three-dimensional images and video with or without the aid of three-dimensional glasses. The 3D viewing system may be connected to the internet via various means, e.g., wireless, wired, WIFI, fast speed mobile connection, etc., so that content hosted outside the system (e.g., on a content server) can be displayed to a user and data about the user and the user's interactions with the viewing system can be stored and tracked remotely. Alternatively or additionally, the 3D viewing system may comprise a computer system, such as a laptop, desktop, or server, which is communicatively connected to the 3D display(s) and capable of displaying three-dimensional images on the 3D display(s). The computer system may comprise one or more applications configured to provide source-specific three-dimensional viewing experiences to users of user devices having different client applications installed.

The 3D viewing system may be used to view, research, and/or purchase products from various retailers or manufacturers. For example, the viewing system may be used to sort through a plurality of products and/or types of products. In an embodiment, the viewing system is implemented as a kiosk, which may be located, for example, in a store or mall. In a first step, a user may scan a matrix barcode affixed to a product or advertisement using a barcode scanning application residing on the user's device. After the user scans the barcode, the barcode scanning application may translate the barcode into its embedded data. Next, the barcode scanning application or other client application on the user's device may wirelessly transmit the data to an application residing on the viewing system. The application residing on the viewing system can then process the data to determine what product or marketing campaign the user is interested in. Alternatively or additionally, the user may enter data (e.g., gender, product interest, size, color or other preferences, etc.) directly into the kiosk, for example, through a user interface with the application residing on the viewing system.

Once the user's interest is known, the 4D or virtual reality experience may begin. This virtual reality experience can be achieved by using the combination of the 3D display(s), body motion sensor camera(s) (e.g., the Microsoft® Kinect®), and associated software. For example, products matching or in the same category of the identified product may be presented on the 3D display(s). The software of the viewing system may render the products such that they appear to come out from the display(s) and toward the user, and even passing by the user.

In some embodiments, once the initial visual is completed (e.g., all the matching products have been presented), a display of a finite number (e.g., 10-20 items) may then be presented on the 3D display. The user can then "grab" the individual items from the display. In an embodiment, if an item is not of interest to the user, the user can "throw" the item and the item will "disappear" into the distance. This interaction between the user and the items can be achieved by using the body motion sensor camera(s), which can include a depth of field camera and the ability to perform gesture recognition. This allows the user's body (e.g., hands) to appear to touch and manipulate the items being displayed. For example, the user can move an item around with his or her hands to view it at different angles or distances.

In an embodiment, if the user likes an item, the user can virtually hold the item and scan a matrix barcode located on the virtual product (e.g., located on the bottom of the virtual product) using the user's device. In this embodiment, the barcode scanning application of the user's device may be scanning a barcode displayed on the display(s). Alternatively, a client application on the user device may simply wirelessly interact with an application of the viewing system to notify the viewing system that the user is interest in the product currently being virtually held or manipulated. In either case, the user can get additional information (e.g., name, costs, content/video/audio) sent to his or her user device. In some embodiments, an option to purchase the product may be presented to the user via his or her user device or via the viewing system's display(s) (e.g., as a check out button or link). In other embodiments, a notification may appear to the user indicating that an in-store sales representative will bring or send the product to the user.

Figure 3A:
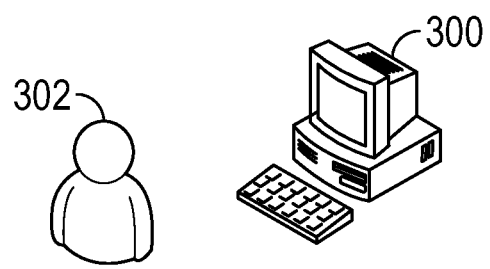
FIG. 3A is a representation of a user and user device, according to an embodiment.
Figure 3B:
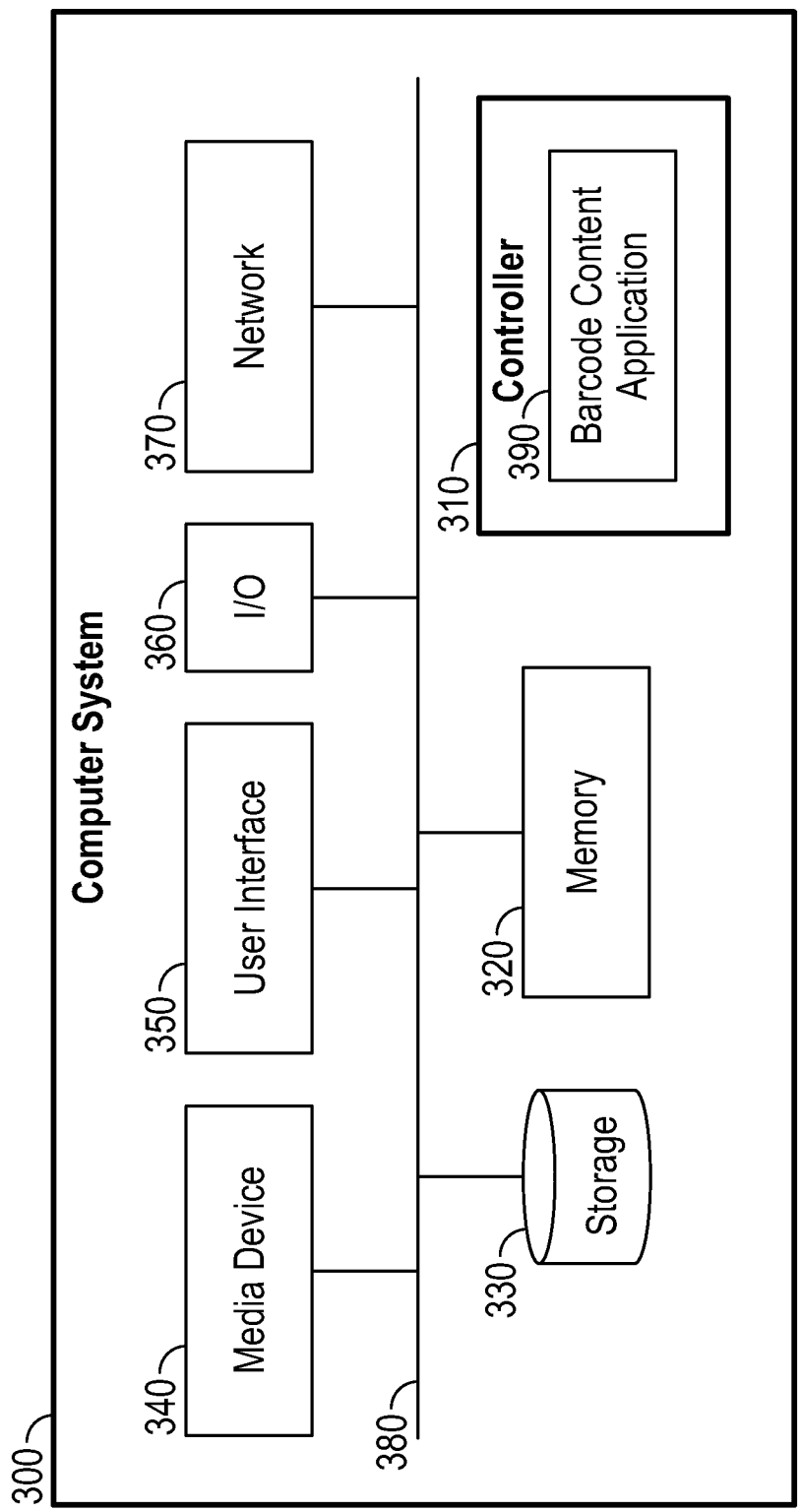
FIG. 3B is a block diagram of a user device, according to an embodiment.
Figure 4:
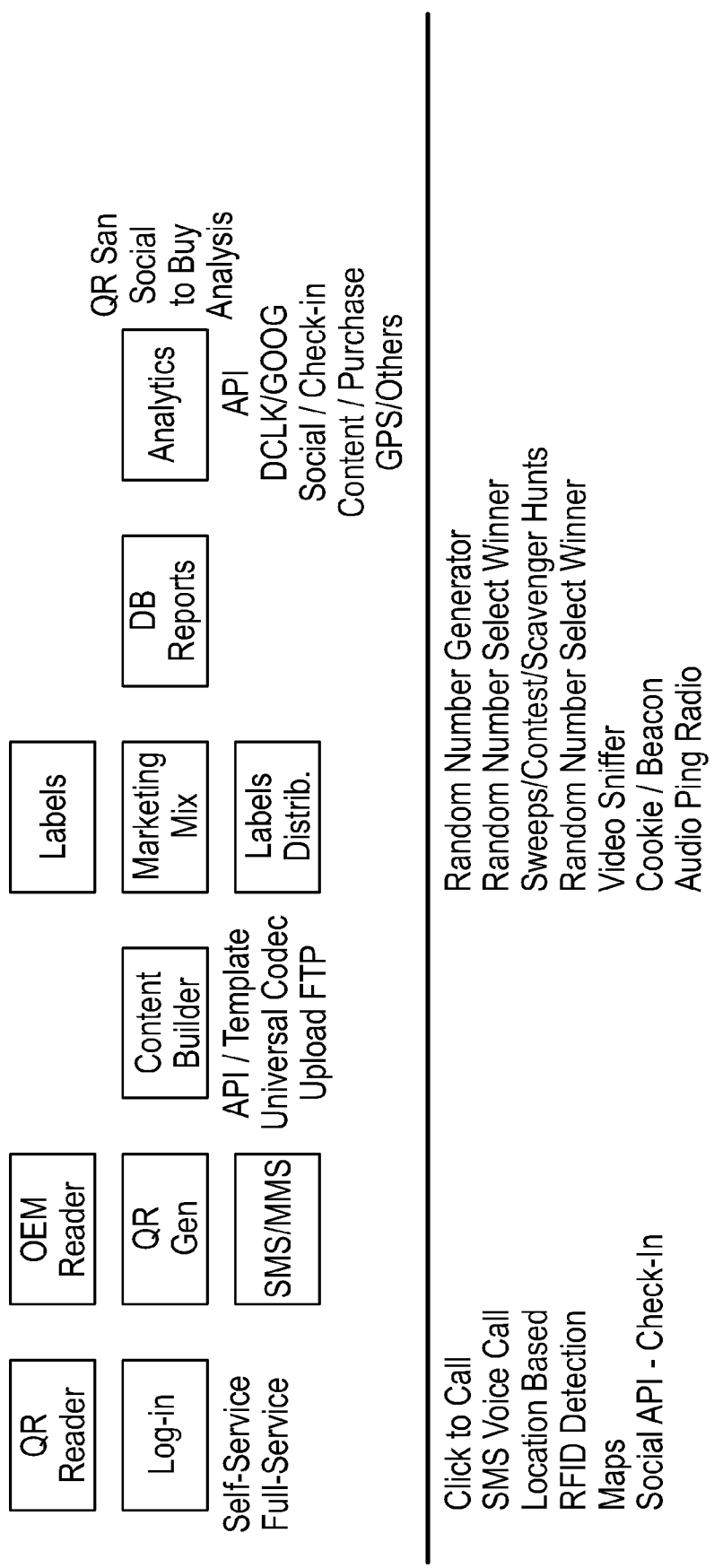
FIG. 4 illustrates the modules and functions that may be implemented in the disclosed system, according to an embodiment.

FIG. 3A illustrates a representation of a computer system 300 and a user 302. While the computer system 300 is shown as a desktop computer system, the computer system may also be a handheld device (e.g., smart phone, tablet PC). The user 302 uses the computer system 300 to read barcodes and receive an augmented barcode experience, as described herein. The computer system 300 may store and execute a barcode content application 390 (FIG. 3B). For example, while the barcode scanning may usually be performed on a mobile user device, in some embodiments, the user may desire to access the scanned information on a desktop computer so that he or she has increased options (e.g., easily printing coupons, attaching pictures saved on the desktop, etc.).

FIG. 3B is a functional block diagram illustrating the computer system 300 hosting the barcode content application 390. The controller 310 is a hardware processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the barcode content application 390 as a software system. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data temporarily or for long-term use by other components of the computer system 300, including data used by the barcode content application 390. Such stored data may include previously measured values (e.g., athletic values). In one implementation, storage 330 is a hard disk drive.

The media device 340 receives removable media and reads and/or writes data to the removable media. In one implementation, for example, the media device 340 is an optical disc drive.

The user interface 350 includes components for accepting user input from the user of the computer system 300 and presenting information to the user. In one implementation, the user interface 350 includes a keyboard, a mouse, audio speakers, and a display monitor. The controller 310 uses input from the user to adjust the operation of the computer system 300.

The I/O interface 360 includes one or more I/O ports to connect to corresponding I/O devices, such as external storage or peripheral devices (e.g., a printer or a PDA). In one implementation, the ports of the I/O interface 360 include ports such as USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

Various illustrative implementations of the present invention have been described. However, one of ordinary skill in the art will see that additional implementations are also possible and within the scope of the present invention. Accordingly, the present invention is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

What is claimed is:

1. A system for augmenting a user experience using a barcode, the system comprising:
    at least one hardware processor; and
    at least one executable software module that, when executed by the at least one hardware processor,
        receives a first request for content associated with a barcode from a first user device, wherein the first request comprises an identifier,
        responds to the first request by providing content for creating a personalized message to the first user device,
        receives a personalized message from the first user device,
        associates the identifier with the personalized message,
        receives a second request for content associated with the barcode from a second user device, wherein the second request comprises the identifier, and
        responds to the second request by providing the personalized message, received from the first user device, to the second user device.

2. The system of claim 1, wherein the first request and the second request are identical.

3. The system of claim 2, wherein both the first request and the second request comprise a URL embedded within the barcode.

4. The system of claim 1, further comprising at least one database, and wherein the at least one executable software module stores the association between the identifier and the personalized message in the at least one database.

5. The system of claim 1, further comprising at least one database, and wherein the at least one executable software module stores a time of the first request and a time of the second request in the at least one database.

6. The system of claim 5, wherein the first request is received from a first location and the second request is received from a second location, and the at least one executable software module stores the first location and second location in the at least one database.

7. The system of claim 1, wherein the at least one executable software module comprises a message creation application, wherein the content for creating a personalized message comprises at least one user interface for interacting with the message creation application, and wherein the personalized message is received through one or more interactions with the at least one user interface.

8. A method for augmenting a user experience using a barcode, the method comprising, by at least one hardware processor:
    receiving a first request for content associated with a barcode from a first user device, wherein the first request comprises an identifier;
    responding to the first request by providing content for creating a personalized message to the first user device;
    receiving a personalized message from the first user device;
    associating the identifier with the personalized message;
    receiving a second request for content associated with the barcode from a second user device, wherein the second request comprises the identifier; and responding to the second request by providing the personalized message, received from the first user device, to the second user device.

9. The method of claim 8, wherein the first request and the second request are identical.

10. The method of claim 9, wherein both the first request and the second request comprise a URL embedded within the barcode.

11. The method of claim 8, further comprising storing the association between the identifier and the personalized message in at least one database.

12. The method of claim 8, further comprising storing a date and time of the first request and a date and time of the second request in at least one database.

13. The method of claim 12, wherein the first request is received from a first location and the second request is received from a second location, and further comprising storing the first location and second location in the at least one database.

14. A system for tracking user interactions with barcodes, the system comprising:
   at least one hardware processor;
   at least one database; and
   at least one executable software module that, when executed by the at least one hardware processor,
      receives a first request from a user, the first request comprising a user identifier and data from a first barcode,
      stores a first record of the first request in the at least one database, the first record comprising the user identifier,
      receives a second request from the user, wherein the second request comprises the user identifier and data from a second barcode,
      stores a second record of the second request in the at least one database, the second record comprising the user identifier, and
      identifies an association between the first record and the second record based on the user identifier.

15. The system of claim 14, wherein the data from the first barcode comprises a first indication that the first barcode is located on an item, and the data from the second barcode comprises a second indication that the user has purchased a product.

16. The system of claim 15, wherein the association between the first record and the second record represents a conversion of the user to a purchaser, and the at least one executable software module reports an aggregate conversion value based on identified associations between a plurality of records associated with a plurality of users.

17. The system of claim 15, wherein the item is an advertisement.

18. The system of claim 15, wherein the item is a product.

19. The system of claim 15, wherein the first indication comprises a first uniform resource locator (URL) and the second indication comprises a second URL which is different than the first URL.

20. The system of claim 14, wherein the first record comprises a time and location of the first request and the second record comprises a time and location of the second request.

* * * * *